United States Patent [19]

Kawamura et al.

[11] Patent Number: 4,997,736
[45] Date of Patent: Mar. 5, 1991

[54] LAYERED ELECTROPHOTOGRAPHIC SENSITIVE MEMBER COMPRISING AMORPHOUS SILICON CARBIDE

[75] Inventors: Takao Kawamura, Sakai; Naooki Miyamoto, Yohkaichi; Hiroshi Itoh, Yohkaichi; Hitoshi Takemura, Yohkaichi, all of Japan

[73] Assignee: Kyocera Corporation, Kyoto, Japan

[21] Appl. No.: 399,780

[22] Filed: Aug. 25, 1989

[30] Foreign Application Priority Data

| Aug. 31, 1988 | [JP] | Japan | 63-217324 |
| Aug. 31, 1988 | [JP] | Japan | 63-217334 |
| Feb. 14, 1989 | [JP] | Japan | 1-35927 |
| Feb. 14, 1989 | [JP] | Japan | 1-35928 |

[51] Int. Cl.$^5$ .............................................. G03G 5/14
[52] U.S. Cl. ......................................... 430/57; 430/60
[58] Field of Search .................................... 430/57, 58

[56] References Cited

U.S. PATENT DOCUMENTS 4,810,605  3/1989  Yoshizawa ...................... 430/57 X

FOREIGN PATENT DOCUMENTS 56-14241  2/1981  Japan .

*Primary Examiner*—David Welsh
*Attorney, Agent, or Firm*—Spensley Horn Jubas & Lubitz

[57] ABSTRACT

The present invention relates to an electrophotographic sensitive member comprising a photoconductive layer formed of amorphous silicon carbide and an organic semiphotoconductive layer piled up.

Photoconductive materials of an electrophotographic sensitive member include inorganic materials, such as Se, Se-Te, $As_2Se_3$, ZnO, CdS and amorphous silicon, and various kinds of organic material. Of them, Se has been first used, and then also ZnO, CdS and amorphous silicon have been practically used. On the other hand, as to the organic materials, PVK—TNF has been first practically used, and then a separated function type sensitive member, in which a function of generating an electric charge and a function of transporting the electric charge are put in charge by separate materials, has been proposed. The organic materials have been remarkably developed by this separated function type sensitive member.

Also an electrophotographic sensitive member, in which an organic photoconductive layer is piled on an inorganic photoconductive layer, has been proposed. For example, a sensitive member, in which an organic photoconductive layer is piled on a Se layer, was already practically used. However, this sensitive member showed disadvantages in that Se itself is harmful and the sensitivity on the side of long wavelengths is inferior.

So, a built-up sensitive member comprising a photoconductive layer formed of amorphous silicon carbide and an organic photoconductive layer has been proposed in Japanese Patent Laid-Open No. Sho 56-14241. With this sensitive member, the above described problems have been eliminated to obtain characteristics such as antipollution and high photosensitivity.

It has been, however, found from the measurement of the photosensitivity, surface electric potential and residual electric potential of such the electrophotographic sensitive member produced by the present inventors that satisfactory characteristics are not obtained yet and further improvements are required.

The present invention has been achieved as a result of the investigation aiming at the provision of an electrophotographic sensitive member showing satisfactory characteristics, such as photosensitivity, surface electric potential and residual electric potential, in view of the above description. It is an object of the present invention to provide an electrophotographic sensitive member capable of obtaining the high photosensitivity and surface electric potential and reducing the residual electric potential.

4 Claims, 14 Drawing Sheets

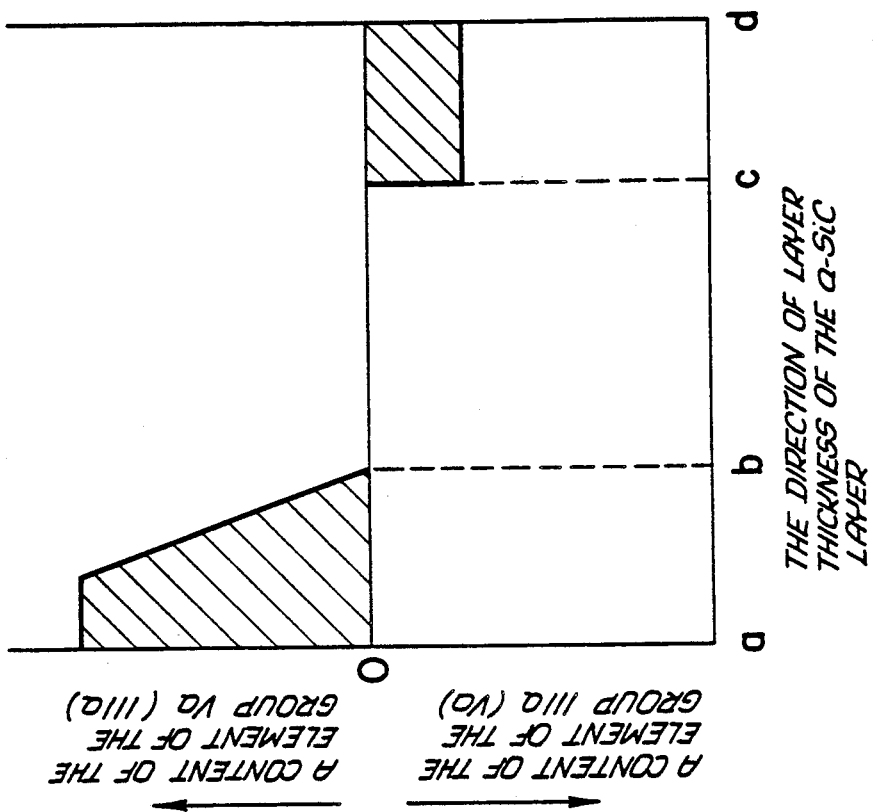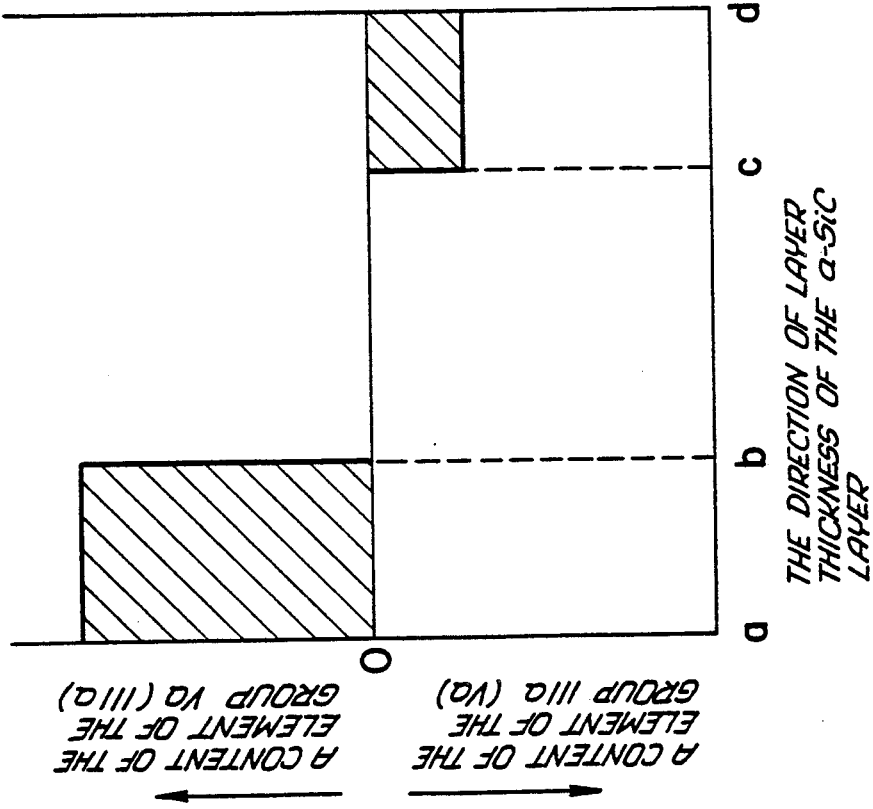

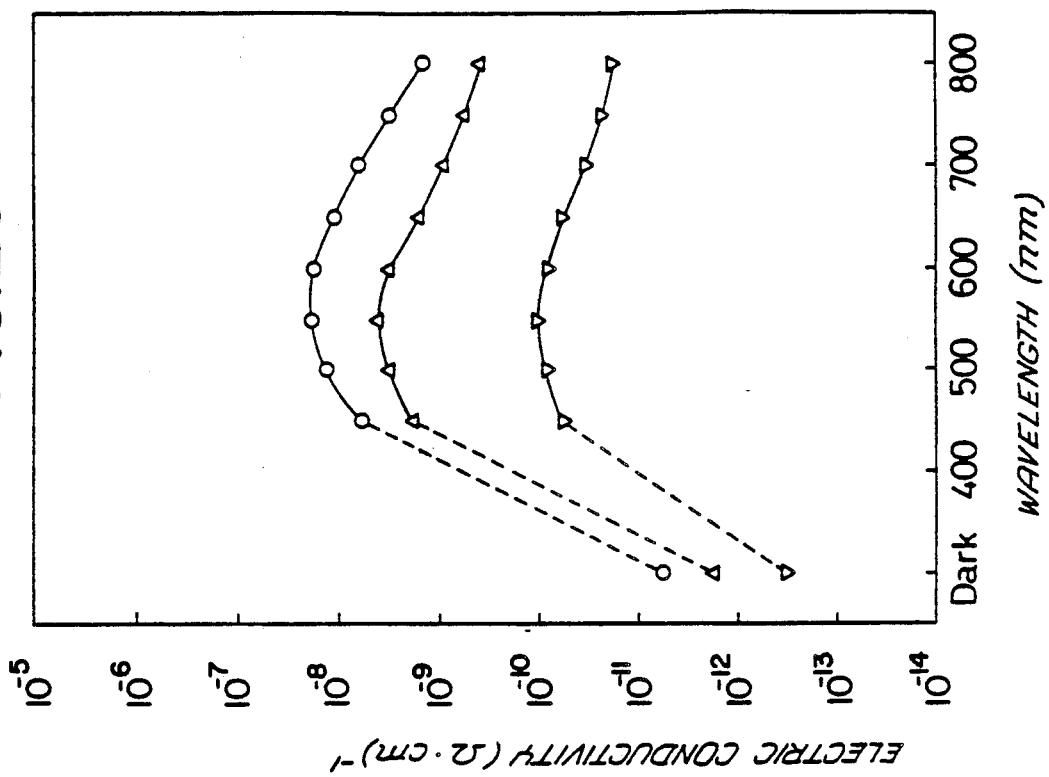
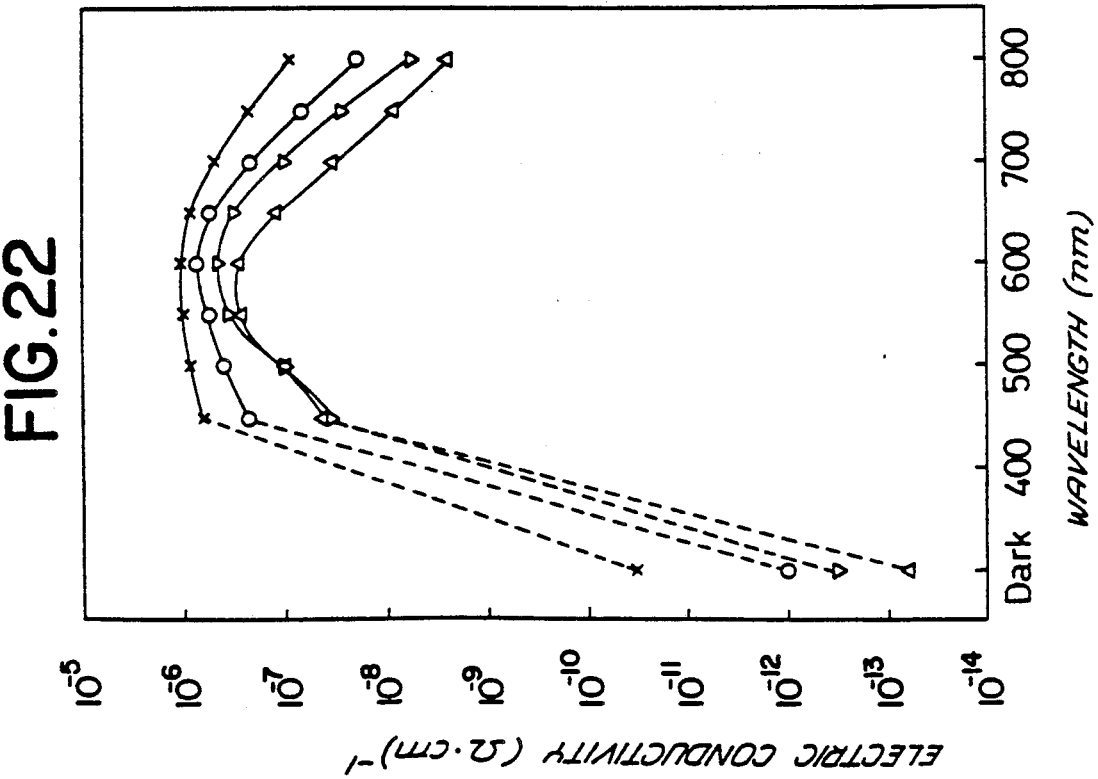

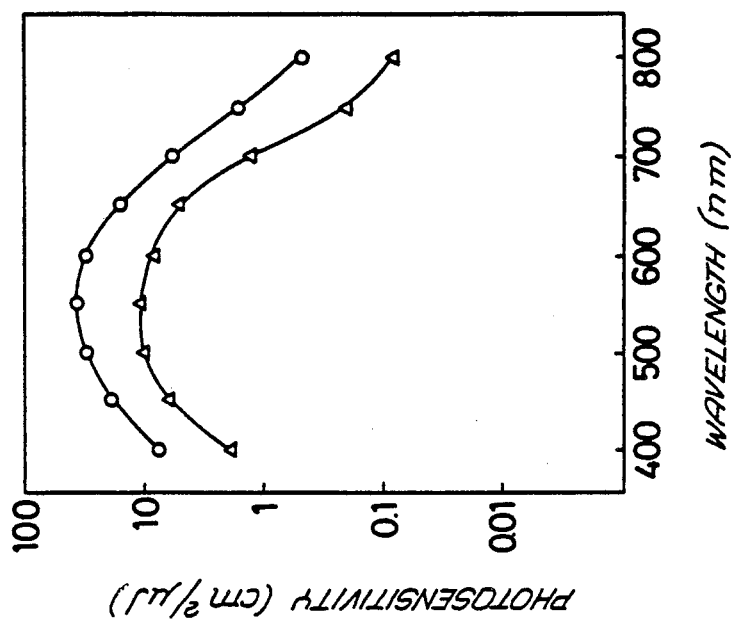
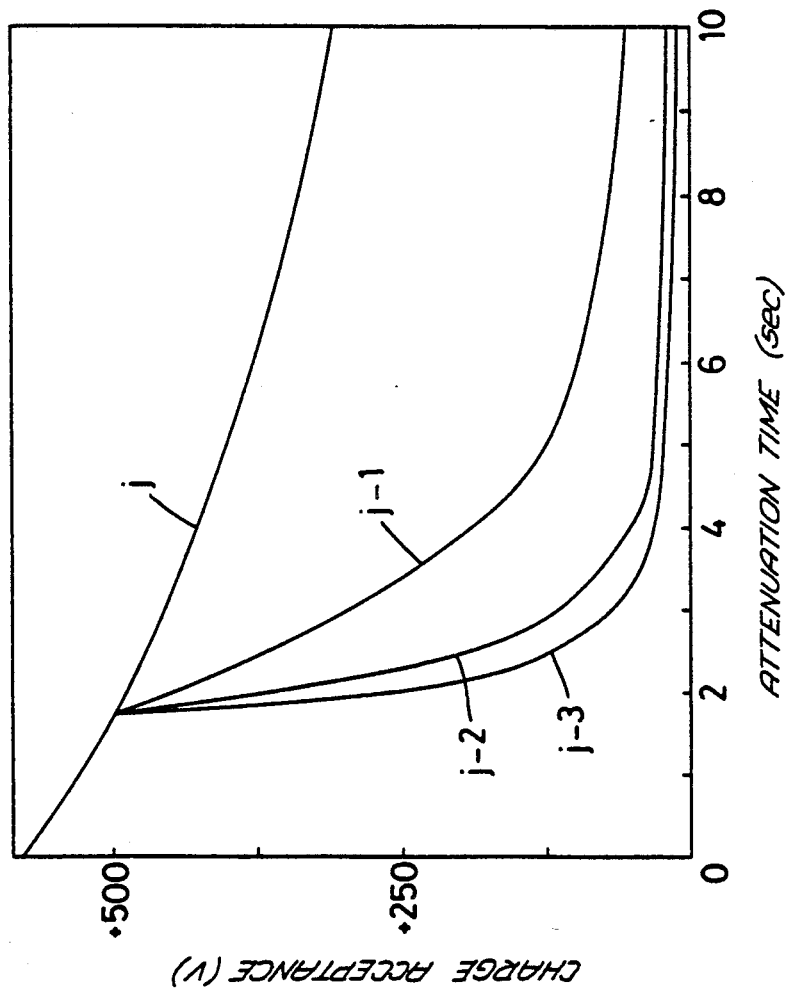

LAYERED ELECTROPHOTOGRAPHIC SENSITIVE MEMBER COMPRISING AMORPHOUS SILICON CARBIDE

BACKGROUND OF THE INVENTION

The present invention relates to an electrophotographic sensitive member comprising a photoconductive layer formed of amorphous silicon carbide and an organic semiphotoconductive layer piled up. [Prior Arts and Problems thereof]

Photoconductive materials of an electrophotographic sensitive member include inorganic materials, such as Se, Se—Te, $As_2Se_3$, ZnO, CdS and amorphous silicon, and various kinds of organic material. Of them, Se has been first used, and then also ZnO, CdS and amorphous silicon have been practically used. On the other hand, as to the organic materials, PVK—TNF has been first practically used, and then a separated function type sensitive member, in which a function of generating an electric charge and a function of transporting the electric charge are put in charge by separate materials, has been proposed. The organic materials have been remarkably developed by this separated function type sensitive member.

Also an electrophotographic sensitive member, in which an organic semiphotoconductive layer is piled on an inorganic photoconductive layer, has been proposed.

For example, a built-up sensitive member, in which an organic semiphotoconductive layer is piled on a Se layer, was already practically used. However, this sensitive member showed disadvantages in that Se itself is harmful and the sensitivity on the side of long wavelengths is inferior.

So, a built-up sensitive member comprising a photoconductive layer formed of amorphous silicon carbide and an organic semiphotoconductive layer has been proposed in Japanese Patent Laid-Open No. Sho 56-14241. With this sensitive member, the above described problems have been eliminated to obtain characteristics such as antipollution and high photosensitivity.

It has been, however, found from the measurement of the photosensitivity, surface electric potential and residual electric potential of such the electrophotographic sensitive member produced by the present inventors that satisfactory characteristics are not obtained yet and further improvements are required.

SUMMARY OF THE INVENTION

Thus, the present invention has been achieved in view of the above description and it is an object of the present invention to provide an electrophotographic sensitive member capable of obtaining the high photosensitivity and surface electric potential and reducing the residual electric potential.

That is to say, a first invention of the present invention provides an electrophotographic sensitive member comprising a photoconductive layer formed of amorphous silicon carbide (hereinafter called a-SiC for short) and an organic semiphotoconductive layer piled on an electrically conductive substrate in this order, characterized in that said a-SiC photoconductive layer has a layer structure comprising a first layer zone, a second layer zone and a third layer zone piled up in this order, said first layer zone containing the Va group elements in the Periodic Table in a quantity of 0 to 5,000 ppm, said second layer zone containing the IIIa group elements in the Periodic Table in a quantity of 0 to 200 ppm, said third layer zone containing the IIIa group elements in the Periodic Table in a quantity of 1 to 1,000 ppm, a thickness of the first layer zone being set within a range of 0.01 to 3 μm, a thickness of the second layer zone being set within a range of 0.01 to 3 μm, and a thickness of the third layer zone being set within a range of 0.01 to 3 μm. A second invention provides an electrophotographic sensitive member comprising an a-SiC photoconductive layer and an organic photoconductive layer piled on an electrically conductive substrate in this order, characterized in that said a-SiC photoconductive layer has a layer structure comprising a first layer zone, a second layer zone and a third layer zone, said first layer zone containing the IIIa group elements in the Periodic Table in a quantity of 1 to 10,000 ppm, said second layer zone containing the IIIa group elements in the Periodic Table in a quantity of 0 to 200 ppm, said third layer zone containing the Va group elements in the Periodic Table in a quantity of 1 to 300 ppm, a thickness of the first layer zone being set within a range of 0.01 to 3 μm, a thickness of the second layer zone being set within a range of 0.01 to 3 μm, and a thickness of the third layer zone being set within a range of 0.01 to 3 μm.

DESCRIPTION OF THE DRAWINGS

FIGS. 12 to 17 are graphs showing a content of the Va— or IIIa group elements and a content of the IIIa— or Va group elements in the direction of layer thickness of the amorphous silicon carbide photoconductive layer; and FIGS. 18 to 23 are graphs showing a relation between a wavelength and a conductivity;

FIGS. 24 and 26 are graphs showing a relation between an attenuation time and a charge acceptance;

FIGS. 25 and 27 are graphs showing a relation between a wavelength and a photosensitivity

DETAILED DESCRIPTION

The present invention is below described in detail.

Figure 1:
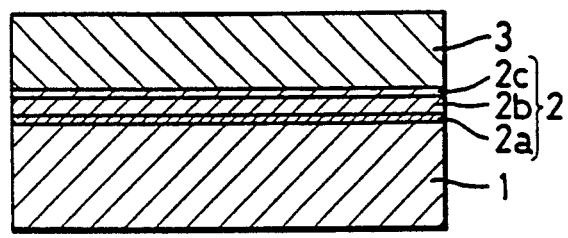
FIG. 1 is a sectional view showing a layer structure of an electrophotographic sensitive member according to the present invention.

FIG. 1 shows a layer structure of an electrophotographic sensitive member according to the first and second inventions of the present invention. Referring now to FIG. 1, an a-SiC photoconductive layer (2) and an organic semiphotoconductive layer (3) are piled on an electrically conductive substrate (1) in this order. And, said a-SiC photoconductive layer (2) has a function of generating an electric charge and said organic photoconductive layer (3) has a function of transporting an electric charge.

The first invention of the present invention is characterized in that a first layer zone (2a), a second layer zone (2b) and a third layer zone (2c) are formed within the a-SiC photoconductive layer (2) in this order, the Va group elements in the Periodic Table (hereinafter called the Va group elements for short) being contained in said first layer zone (2a) in a quantity within an appointed range, the IIIa group elements in the Periodic Table (hereinafter called the IIIa group elements) being contained in said third layer zone (2c) in a quantity within an appointed range, and thicknesses of the respective layer zones being set within appointed ranges, to improve the photosensitivity, surface electric potential and residual electric potential.

It is characterized in also that an electrophotographic sensitive member for use in negative charge is obtained by the formation of such the layer zones.

In addition, the second invention is characterized in that a first layer zone (2a), a second layer zone (2b) and a third layer zone (2c) are formed within the a-SiC photoconductive layer (2) in this order, the IIIa group elements being contained in said first layer zone (2a) in a quantity within an appointed range, the Va group elements being contained in said third layer zone (2c) in a quantity within an appointed range, and thicknesses of the respective layer zones being set within appointed ranges, to improve the photosensitivity, surface electric potential and residual electric potential.

It is characterized in also that an electrophotographic sensitive member for use in positive charge is obtained by the formation of such the layer zones.

In the above described first and second inventions of the present invention, at first, the a-SiC photoconductive layer (2) consists of amorphous Si element and amorphous C element as well as hydrogen (H) element or halogen element introduced into an end portion of a dangling bond of these Si element and C element and it is preferable that its compositional formula is set as follows:

$$[Si_{1-x}C_x]_{1-y}A_y$$

wherein A is H element or halogen element; $0<x<0.5$, preferably $0.01<x<0.4$, most suitably $0.05<x<0.2$; and $0.1<y<0.5$, preferably $0.2<y<0.5$, most suitably $0.25<y<0.45$.

If the x value is within a range of $0<x<0.5$, the high photoconductivity is obtained. In addition, if the x value is set within a range of $0.01<x<0.4$, the photosensitivity on the side of short wavelengths is enhanced and the photoconductivity is remarkably enhanced to increase the exciting function of a photocarrier.

In addition, in the case where the y value is 0.1 or less, the film quality is deteriorated to remarkably reduce the photoconductivity. In addition, in the case where the y value is set within a range of $0.2<y<0.5$, the dark conductivity is reduced and the photoconductivity is increased to obtain the superior photoconductance, and also the superior adhesion to the substrate.

Hydrogen (H) element and halogen element are contained in this a-SiC photoconductive layer (2) for the end of the dangling bond. However, of these elements, H element is desirable in view of the fact that it is easy to be taken in the end portion thereby reducing the density of the localized state in the band gap.

In addition, it is preferable that the thickness of the a-SiC photoconductive layer (2) is set within a range of 0.15 to 5 μm, preferably 0.2 to 3 μm. If the thickness of the a-SiC photoconductive layer (2) is set within this range, the high photoconductivity is obtained and the residual electric potential is reduced.

Next, as to the first layer zone (2a), the second layer zone (2b), the third layer zone (2c) and the organic photoconductive layer (3), the first invention and the second invention are separately described.

FIRST INVENTION

The first layer zone (2a) does not substantially contain or contains the Va group elements in a quantity of 0 to 5,000 ppm, preferably 300 to 3,000 ppm, thereby forming a n-type semiconductor to allow photocarriers, in particular negative electric charges, generated in the a-SiC photoconductive layer (2) to smoothly flow toward the side of the substrate. Furthermore, carriers on the side of the substrate can be prevented from flowing into the a-SiC photoconductive layer (2).

That is to say, it can be said that the first layer zone (2a) is brought into non-ohmic contact with the substrate (1) in view of the fact that the former has the rectification property for the latter.

Accordingly, this non-ohmic contact leads to the enhanced surface electric potential and the reduced residual electric potential.

Such the first layer zone (2a) is expressed by a content of the Va group elements but in the case where the content of the Va group elements is uneven in the direction of layer thickness of the first layer zone (2a), it is expressed by an average content.

In the case where the content of the Va group element exceeds 5,000 ppm, internal defects in this layer zone are increased to deteriorate the film quality, reduce the surface electric potential and increase the residual electric potential.

That is to say, the first layer zone (2a) is further concretely set by a thickness thereof together with the content of the Va group elements. That is to say, the thickness of the first layer zone (2a) is set within a range of 0.01 to 3 μm, preferably 0.1 to 0.5 μm. In this time, the residual electric potential can be reduced and the resistance to voltage can be enhanced.

Besides, it is desired that the first layer zone (2a) is set as follows in compositional ratio of SiC together with the content of the Va group elements and the thickness.

That is to say, in the case where the compositional formula $Si_{1-x}C_x$ is used, it is desirable that $0.1<x<0.5$ holds good. In this time, not only the surface electric potential can be enhanced but also the adhesion to the substrate can be increased.

In addition, it is preferable that the ratio of C is selected to be larger in comparison with that in the second layer zone (2b) when the ratio of C element is set in the above described manner, whereby advantages occur in that the surface electric potential and the adhesion to the substrate can be enhanced.

The above described Va group elements include N, P, As, Sb and Bi. Of them, P is desirable in view of the sensitive variability of semiconductive characteristics due to the superiority in covalent bond and the attainment of the superior chargeability and photosensitivity.

In addition, P element is desirable as the Va group elements also in the second invention which will be mentioned later.

The third layer zone (2c) contains the IIIa group elements in a quantity of 1 to 1,000 ppm, preferably 3 to 100 ppm, whereby forming a P-type semiconductive layer on the side of the organic photoconductive layer (3) within the a-SiC photoconductive layer (2) to allow photocarriers, in particular positive electric charges, generated in this layer (2) to smoothly flow toward the organic photoconductive layer (3). As a result, the surface electric potential is increased and the residual electric potential is reduced.

Although the third layer zone (2c) is expressed by a content of the IIIa group elements in such the manner, in the case where said content is uneven in the direction of layer thickness, an average content is used.

In the case where the content of the IIIa group elements is less than 1 ppm, the chargeability can not be improved while in the case where it exceeds 1,000 ppm, the capacity of generating the photocarriers is inferior and the photosensitivity is reduced.

In addition, the third layer zone (2c) is further concretely set by the thickness thereof together with the content of the IIIa group elements.

That is to say, it is preferable that the thickness of the third layer zone (2c) is set within a range of 0.01 to 3 $\mu$m, preferably 0.1 to 0.5 $\mu$m. In this time, the high photosensitivity is obtained and the residual electric potential is reduced.

The above described IIIa group elements include B, Al, Ga, In and the like. Of them, B is desirable in view of the sensitive variability of semiconductive characteristics due to the superior covalent bond and the obtainment of the superior chargeability as well as photosensitivity.

In addition, it is desirable that B element is used as the IIIa group elements also in the second invention which will be mentioned later.

The second layer zone (2b) does not substantially contain or contains the IIIa group elements within a range less than 200 ppm to form an i-type semiconductive layer. This layer is a principal carrier-generating layer of the a-SiC photoconductive layer (2).

It is desirable that the thickness of the second layer zone (2b) is set within a range of 0.01 to 3 $\mu$m, preferably 0.1 to 2 $\mu$m. In this time, the high photosensitivity is obtained and the residual electric potential is reduced.

As above described, a p-i-n junction is formed in the a-SiC photoconductive layer (2), so that positive holes of the carriers generated in this layer (2) go toward the organic photoconductive layer (3) while electrons go toward the substrate (1). Accordingly, a negative charge type electrophotographic sensitive member is obtained.

In such the negative charge type electrophotographic sensitive member, electron donative compounds are selected for the organic photoconductive layer (3). These compounds include for example high molecular compounds, such as poly-N-vinylcarbazole, polyvinylpyrene, polyvinylanthracene and pyrene-formaldehyde condensation products, and low molecular compounds, such as oxadiazole, oxazole, pyrazoline, triphenylmethane, hydrazone, trialylamine, N-phenylcarbazole and stylbene. These low molecular compounds are used in the form of dispersion in polycarbonate, polyester, methacrylic resin, polyamide, acrylepoxy, polyethylene, phenol, polyurethane, butylal resin, polyvinyl acetate, urea resin and the like.

SECOND INVENTION

The first layer zone (2a) in the second invention contains the IIIa group elements in a quantity of 1 to 10,000 ppm, preferably 300 to 3,000 ppm, to form a P-type semiconductor thereby allowing the photocarriers, in particular the positive charges, generated in the a-SiC photoconductive layer (2) to smoothly flow toward the side of the substrate. In addition, the carriers on the side of the substrate can be prevented from flowing into the a-SiC photoconductive layer (2).

That is to say, it can be said that the first layer zone (2a) is brought into non-ohmic contact with the substrate (1) in view of the rectification property for the substrate (1).

Accordingly, this non-ohmic contact leads to the enhanced surface electric potential and the reduced residual electric potential.

Such the first layer zone (2a) is expressed by a content of the IIIa group elements therein. However, in the case where said content is uneven in the direction of layer thickness, an average content is used.

If the content of the IIIa group elements is less than 1 ppm, the effect of preventing the carriers from entering from the side of the substrate and improving the chargeability is not obtained while if it exceeds 10,000 ppm, the internal defects of this layer zone are increased to deteriorate the film quality, reduce the surface electric potential and increase the residual electric potential.

In addition, the first layer zone (2a) is further concretely set by a thickness thereof together with the content of the IIIa group elements.

That is to say, it is preferable that the thickness of the first layer zone (2a) is set within a range of 0.01 to 3 $\mu$m, preferably 0.1 to 0.5 $\mu$m. In this time, the residual electric potential can be reduced and the resistance to voltage of the sensitive member can be enhanced.

Furthermore, if the compositional ratio of SiC is set so that x in the compositional formula $Si_{1-x}C_x$ may be within a range of $0.1 < x < 0.5$ together with the content of the IIIa group elements and the thickness in the same manner as described in the first invention, the same effect as in the first invention can be achieved.

In addition, if the C element ratio is selected so as to be larger in comparison with that of the second layer zone (2b) when the C element ratio is set in the above described manner, advantages occur in the possibility of enhancing the surface electric potential and adhesion to the substrate in the same manner as the first invention.

The third layer zone (2c) contains the Va group elements in a quantity of 1 to 300 ppm, preferably 3 to 100 ppm, thereby forming a n-type semiconductor on the side of the organic photoconductive layer (3) within the a-SiC photoconductive layer (2) to allow the photocarriers, in particular negative charges, generated in this layer (2) to smoothly flow into the organic semiphotoconductive layer (3). As a result, the surface electric potential is enhanced and the residual electric potential is reduced.

The third layer zone (2c) is expressed by the content of the Va group elements in the above described manner. However, in the case where said content is uneven in the direction of layer thickness of the third layer zone (2c), an average content is used.

If the content of the Va group elements is less than 1 ppm, the chargeability can not be improved while if it exceeds 300 ppm, the capacity of generating the photoexciting carriers is deteriorated and the photosensitivity is reduced.

In addition, the third layer zone (2c) is further concretely set by a thickness thereof together with the content of the Va group elements.

That is to say, it is preferable that the thickness of the third layer zone (2c) is set within a range of 0.01 to 3 μm, preferably 0.1 to 0.5 μm. In this time, the enhanced photosensitivity is obtained and the residual electric potential is reduced.

The second layer zone (2b) does not substantially contain or contains the IIIa group elements in a quantity less than 200 ppm to form an i-type semiconductive layer. And, this layer is the principal carrier-generating layer of the a-SiC photoconductive layer (2).

It is preferable that a thickness of the second layer zone (2b) is set within a range of 0.01 to 3 μm, preferably 0.1 to 2 μm. In this time, the enhanced photosensitivity is obtained and the residual electric potential is reduced.

As above described, a p-i-n junction is formed in the a-SiC photoconductive layer (2), so that, of the carriers generated in this layer (2), electrons go toward the organic photoconductive layer (3) while positive holes go toward the substrate (1). Accordingly, a positive charge type electrophotographic sensitive member is obtained.

In such the positive charge type electrophotographic sensitive member, electron attractive compounds are selected as the organic photoconductive layer (3). These compounds include for example 2,4,7-trinitrofluorenone and the like.

In the first and second inventions of the present invention, metallic conductors, such as copper, brass, SUS and Al, or insulators, such as glass and ceramics, of which surface is coated with an electrically conductive thin film, are used as said substrate (1) according to circumstances. Above all, Al is advantageous in view of the cost and the adhesion to the a-SiC layer.

Thus, according to the present invention, the layer zones containing the IIIa group elements and the Va group elements in the quantity within the appointed ranges are formed in the a-SiC photoconductive layer to improve the surface electric potential and the residual electric potential and enhance the photosensitivity.

In addition, according to the present invention, the C element-content in the first layer zone (2a), the second layer zone (2b) and the third layer zone (2c) may be varied in the direction of layer thickness, respectively. For example, its examples are shown in FIGS. 7 to 11. Referring to these figures, an axis of abscissa designates the direction of layer thickness, (a) designating a boundary surface of the first layer zone (2a) and the substrate, (b) designating a boundary surface of the first layer zone (2a) and the second layer zone (2b), (c) designating a boundary surface of the second layer zone (2b) and the third layer zone (2c), (d) designating a boundary surface of the third layer zone (2c) and the organic photoconductive layer (3), and an axis of ordinate designating the C element-content.

Furthermore, in the case where the C element-content is varied in the direction of layer thickness within the first layer zone (2a), the second layer zone (2b) or the third layer zone (2c), the C element-content (x value) corresponds to the average C element-content for all over the layer zones (2a), (2b), (2c), respectively.

Besides, in the electrophotographic sensitive member according to the present invention, the content of the Va group elements or the IIIa group elements in the first layer zone (2a) and the content of the IIIa group elements or the Va group elements in the third layer zone (2c) may be varied in the direction of layer thickness. Their examples are shown in FIGS. 12 to 17. In particular, it is desirable in view of the reduction of the residual electric potential that the content of the IIIa group elements or the Va group elements in the third layer zone (2c) is gradually increased toward the organic photoconductive layer.

Referring to these figures, an axis of abscissa designates the direction of layer thickness, (a) designating a boundary surface of the substrate (1) and the first layer zone (2a), (b) designating a boundary surface of the first layer zone (2a) and the second layer zone (2b), (c) designating a boundary surface of the second layer zone (2b) and the third layer zone (2c), (d) designating a boundary surface of the third layer zone (2c) and the organic photoconductive layer (3), and an axis of ordinate designating the content of the IIIa group elements or the Va group elements.

In the case where the content of the IIIa group elements or the Va group elements in the first layer zone (2a) or the third layer zone (2c) is varied in the direction of layer thickness, respectively, the content of the elements corresponds to the average content for all over the layer zones (2a), (2c), respectively.

METHOD ACCORDING TO THE PRESENT INVENTION

Next, a method of producing an electrophotographic sensitive member according to the present invention is described.

The methods of forming a thin film, such as glow discharge decomposition method, ion plating method, reactive sputtering method, vacuum deposition method and CVD method, are used for the formation of the a-SiC layer.

In the case where the glow discharge decomposition method is used, a Si element-containing gas and a C element-containing gas are mixed and the resulting mixture gas is subjected to the plasma decomposition to form a film. Said Si elementcontaining gas includes $SiH_4$, $Si_2H_6$, $Si_3H_8$, $SiF_4$, $SiHCl_3$ and the like. In addition, said C element-containing gas includes $CH_4$, $C_2H_4$, $C_2H_2$, $C_3H_8$ and the like. Above all, $C_2H_2$ is desirable in view to the attainment of the high-speed film formation.

Furthermore, in the case where the mixture gas comprising a $C_2H_2$ gas and the Si element-containing gas is subjected to the glow discharge decomposition to form the a-SiC layer, the film-forming speed is reduced or increased by changing the flow rates of the gases, the mixture ratio of gases, the high-frequency electric power and the like.

However, even in the case where the film-forming speed is low, a sufficiently high film-forming speed in comparison with that in the case where other C element-containing gases are used is attained.

It could be confirmed from experiments repeated by the present inventors that the a-SiC photoconductive layer obtained at the lower film-forming speed is superior to the a-SiC photoconductive layer obtained at the higher film-forming speed in photoconductive characteristic at the same C element-content.

However, also the a-SiC photoconductive layer obtained at the higher film-forming speed shows the sufficient photoconductive characteristics.

Next, one example of the glow discharge decomposition apparatus used in the present preferred embodiment is described with reference to FIG. 2.

Figure 2:
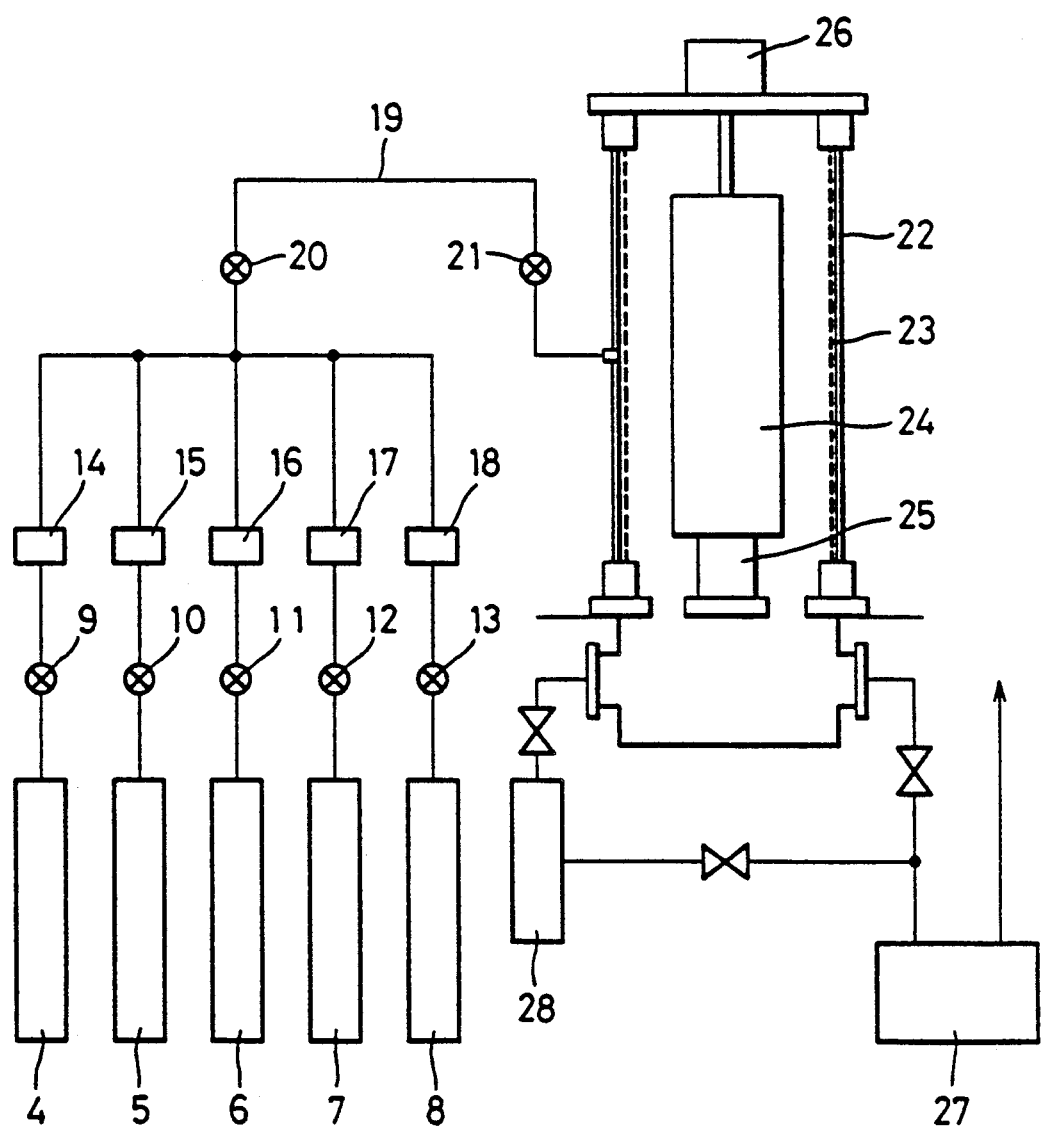
FIG. 2 is a schematic drawing showing a glow discharge decomposition apparatus used in the preferred embodiment.

Referring to FIG. 2, a first tank (4), a second tank (5), a third tank (6), a fourth tank (7) and a fifth tank (8) is filled with $SiH_4$, $C_2H_2$, $PH_3$, $B_2H_6$ ($PH_3$ and $B_2H_6$ are diluted with a hydrogen gas) and H$_2$, respectively. These gases are discharged by opening the respective corresponding first adjusting valve (9), second adjusting valve (10), third adjusting valve (11), fourth adjusting valve (12) and fifth adjusting valve (13). Flow rates of the gases discharged are controlled by means of mass flow controllers (14), (15), (16), (17), (18), respectively, and the respective gases are mixed to be sent to a main pipe (19). In addition, reference numerals (20), (21) designate a stop valve.

The mixture gas flowing through the main pipe (19) is flown into a reaction pipe (22). Said reaction pipe (22) is provided with a capacitively coupled type discharge electrode (23) therewithin. In addition, a cylindrical film-forming substrate (24) is placed on a substrate support member (25) and said substrate support member (25) is driven to rotate and thus said substrate (24) is rotated. And, a high-frequency electric power having an electric power of 50 W to 3 kW and a frequency of 1 to 50 MHz is applied to the electrode (23). Furthermore, the substrate (24) is heated to about 200° to 400° C., preferably about 200° to 350° C., by means of suitable heating means. In addition, the reaction pipe (22) is connected with a rotary pump (27) and a diffusion pump (28) thereby a vacuum condition (a gas pressure during the discharge: 0.01 to 2.0 Torr) required for the film formation by the glow discharge is maintained.

In the case where for example the a-SiC layer containing a P element is formed on the substrate (24) by the use of the glow discharge decomposition apparatus having the above described construction, the first adjusting valve (9), the second adjusting valve (10), the third adjusting valve (11) and the fifth adjusting valve (13) are opened to discharge the SiH$_4$ gas, the C$_2$H$_2$ gas, the PH$_3$ gas and the H$_2$ gas, respectively, and their quantities discharged are controlled by means of the mass flow controllers (14), (15), (16), (18). The respective gases are mixed and the resulting mixture gas is flown into the reaction pipe (22) through the main pipe (19). And, upon setting the vacuum condition within the reaction pipe, the substrate temperature and the high-frequency electric power applied to the electrode to the respective appointed conditions, the glow discharge is produced to speedily form the P element-containing a-SiC film with the decomposition of the gas.

After the a-SiC layer is formed by the above described thin film forming method, the organic photoconductive layer is formed.

The organic photoconductive layer is formed by the dipping method or the coating method. The former is a method in which an article is dipped into a coating solution obtained by dispersing a sensitizer in a solvent and then pulled up at a constant speed followed by the natural drying and the thermal aging (about 1 hour at about 150° C.). In addition, according to the latter coating method, a sensitizer dispersed in a solvent is applied by means of a coater and then the hot wind drying is executed.

PREFERRED EMBODIMENTS

The present invention is below described with reference to the preferred embodiments.

EXAMPLE 1

The a-SiC film (having a layer thickness of about 1 μm) was formed by the glow discharge by means of the glow discharge decomposition apparatus shown in FIG. 2 with setting a flow rate of the SiH$_4$ gas at 200 sccm, setting a flow rate of the H$_2$ gas at 270 sccm, changing a flow rate of the C$_2$H$_2$ gas, setting the gas pressure at 0.6 Torr, setting the high-frequency electric power at 150 W, and setting the substrate temperature at 250° C.

Figure 3:
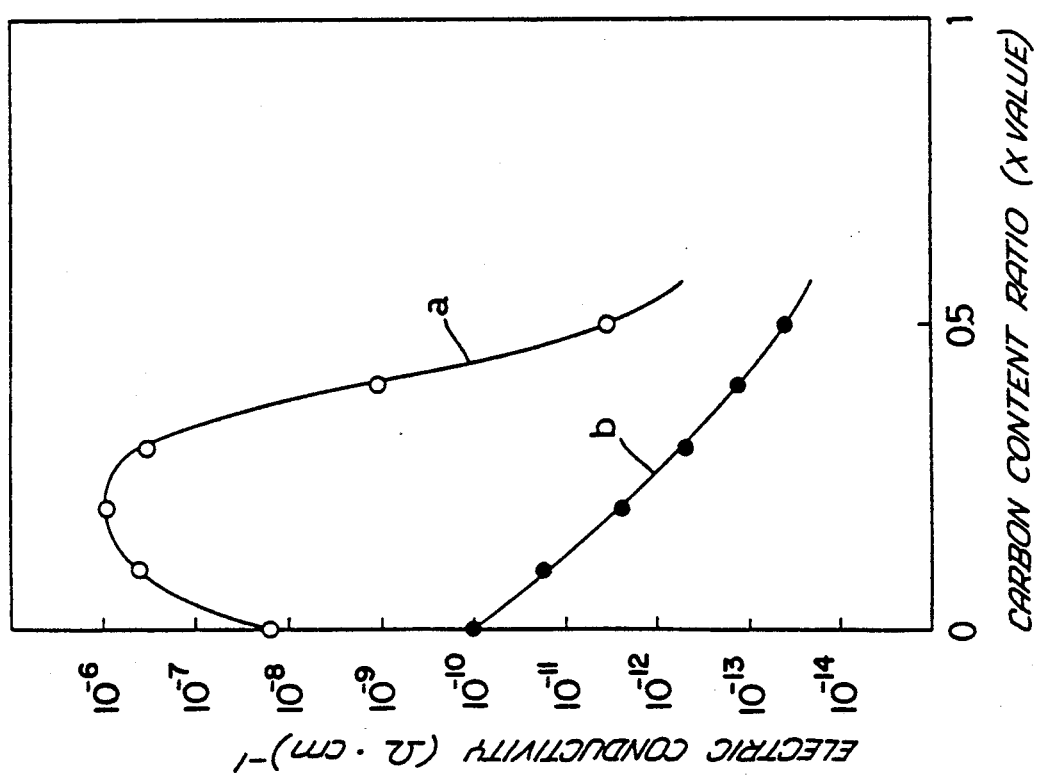
FIG. 3 is a graph showing a relation between a carbon-content and a conductivity.

The C-content of the a-SiC film was changed in this manner, the quantity of C in the film being measured by the XMA method, and the photoconductivity and the dark conductivity being measured with the results as shown in FIG. 3.

In FIG. 3, an axis of abscissa designates the C-content, that is, the value of x in Si$_{1-x}$C$_x$ an axis of ordinate designating the conductivity, marks o designating a plot of the photoconductivity for a light having a wavelength of 550 nm (a quantity of light: 50 μW/cm$^2$), marks ● designating a plot of the dark conductivity, and (a), (b) designating the characteristic curve for the respective a-SiC films. In addition, the H-content of the above described respective a-SiC films was determined by the infrared ray absorption method with the results as shown in FIG. 4.

Figure 4:
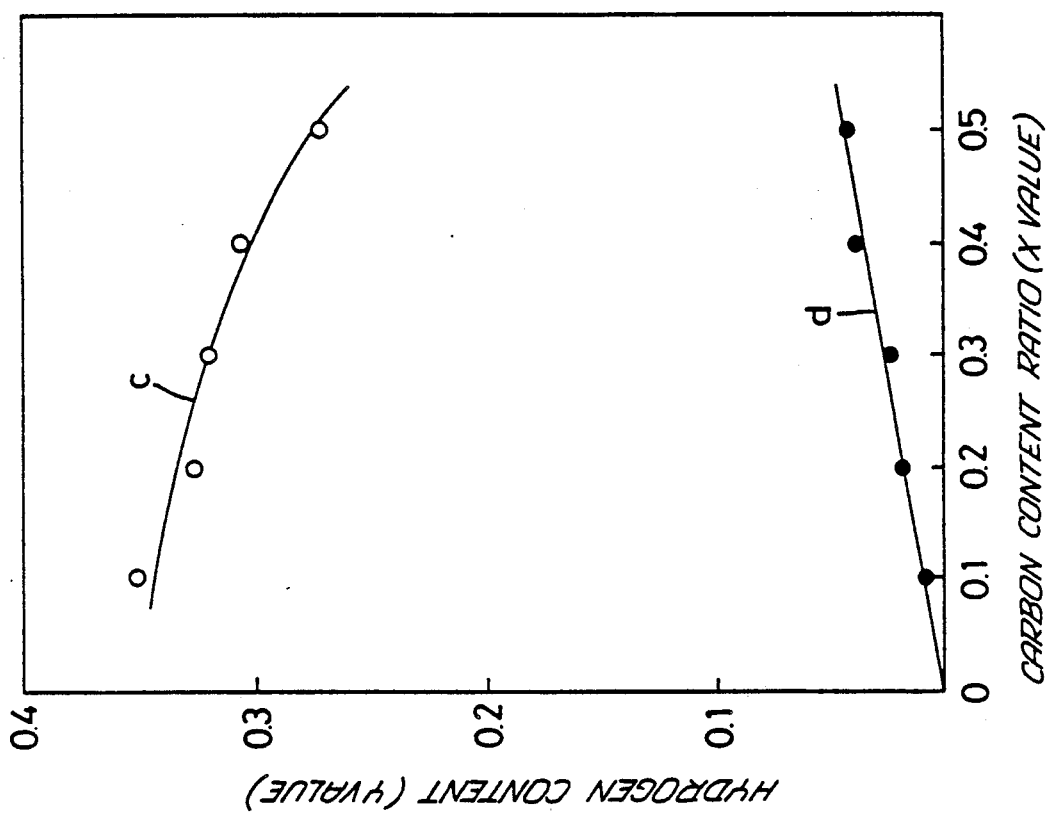
FIG. 4 is a graph showing a relation between a carbon-content and a hydrogen-content.

In FIG. 4, an axis of abscissa designates the value of x in Si$_{1-x}$C$_x$ an axis of ordinate designating the H-content, that is, the value of y in [Si$_{1-x}$C$_x$]$_{1-y}$H$_y$ marks o designating a plot of the quantity of H joined with Si atoms, marks designating a plot of the quantity of H joined with C atoms, and (c), (d) designating the characteristic curve for the respective a-SiC films.

As obvious from FIG. 4, the a-SiC films according to EXAMPLE 1 have the value of y within a range of 0.3 to 0.4.

In addition, as obvious from FIG. 3, if the C-content x is within a range of 0.2 < x < 0.5, not only the high photoconductivity is obtained but also a ratio of the photoconductivity to the dark conductivity is remarkably increased thereby obtaining the superior photosensitivity.

EXAMPLE 2

Next, in this EXAMPLE, the a-SiC film (having a film thickness of about 1 μm) was formed by the glow discharge with setting the flow rate of the SiH$_4$ gas at 200 sccm, setting the flow rate of the C$_2$H$_2$ gas at 20 sccm, setting the flow rate of the H$_2$ gas at 0 to 1,000 sccm, setting the high-frequency electric power at 50 to 300 W, and setting the gas pressure at 0.3 to 1.2 Torr.

Figure 5:
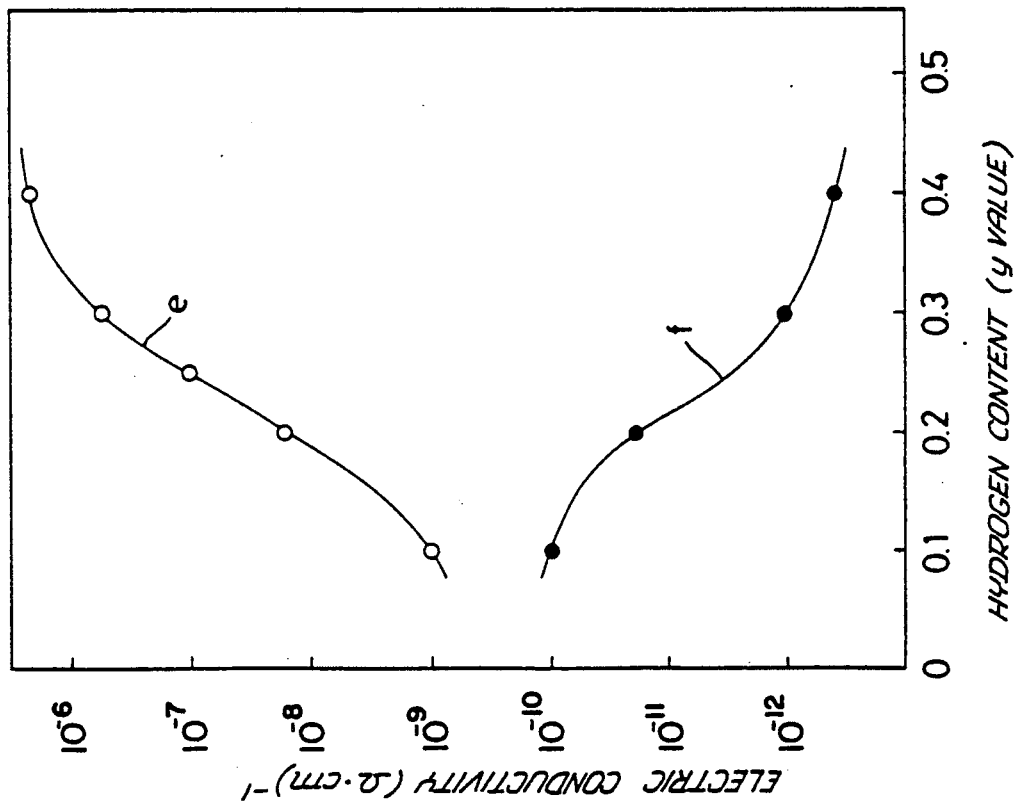
FIG. 5 is a graph showing a relation between a hydrogen-content and a conductivity.
Figure 7:
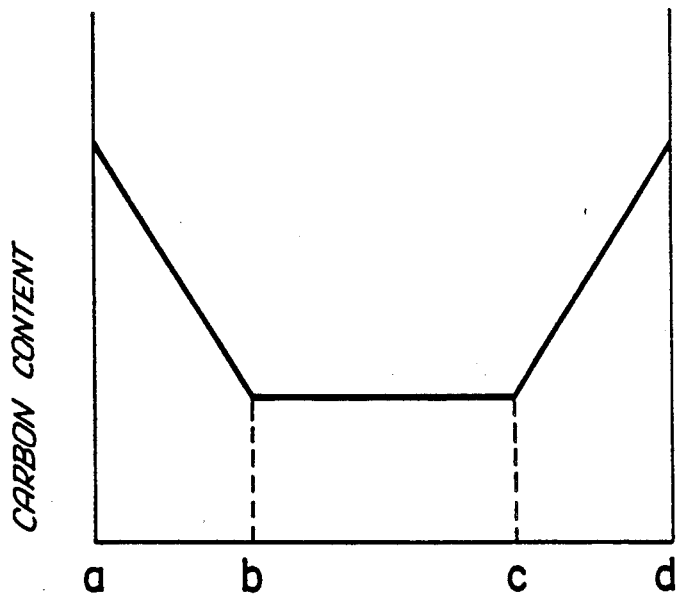
FIGS. 7 to 11 are graphs showing a carbon-content in the direction of layer thickness of an amorphous silicon carbide photoconductive layer.
Figure 8:
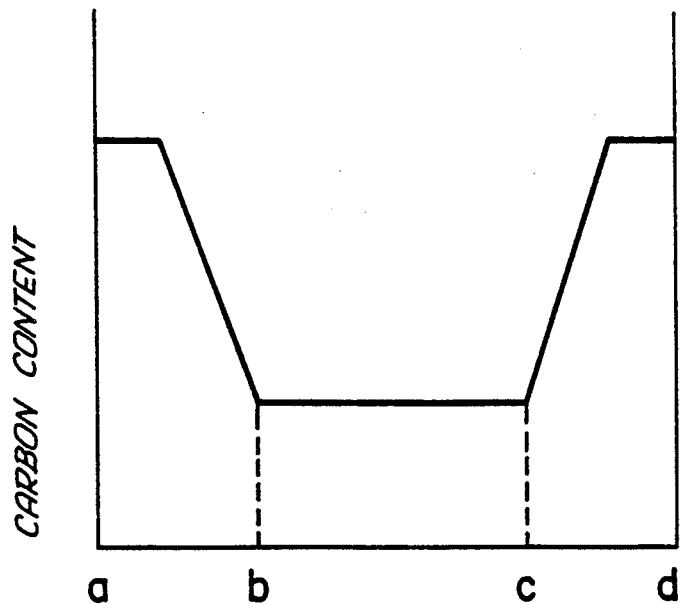
Figure 9:
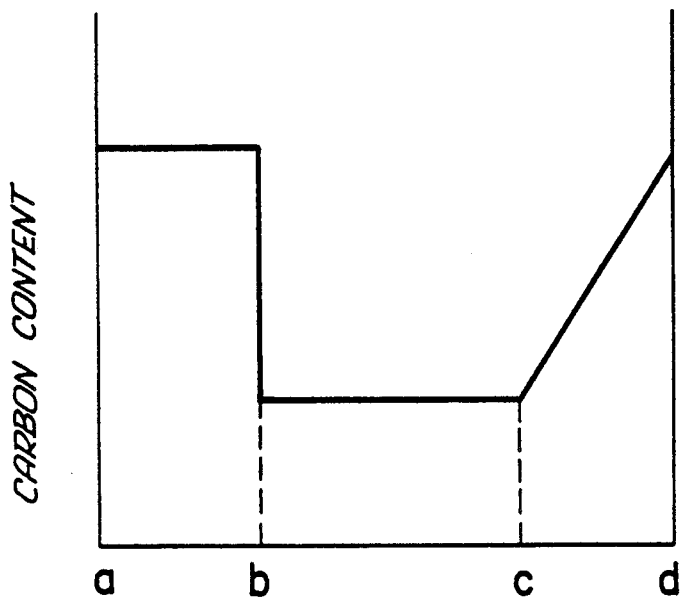
Figure 10:
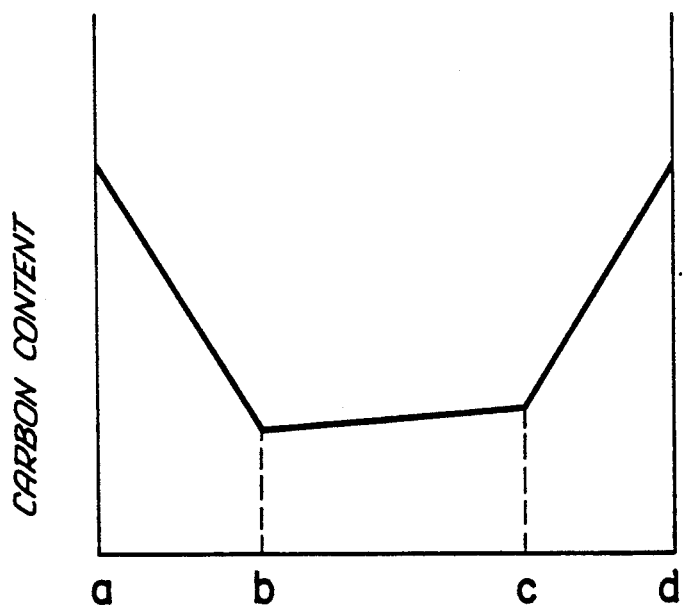
Figure 11:
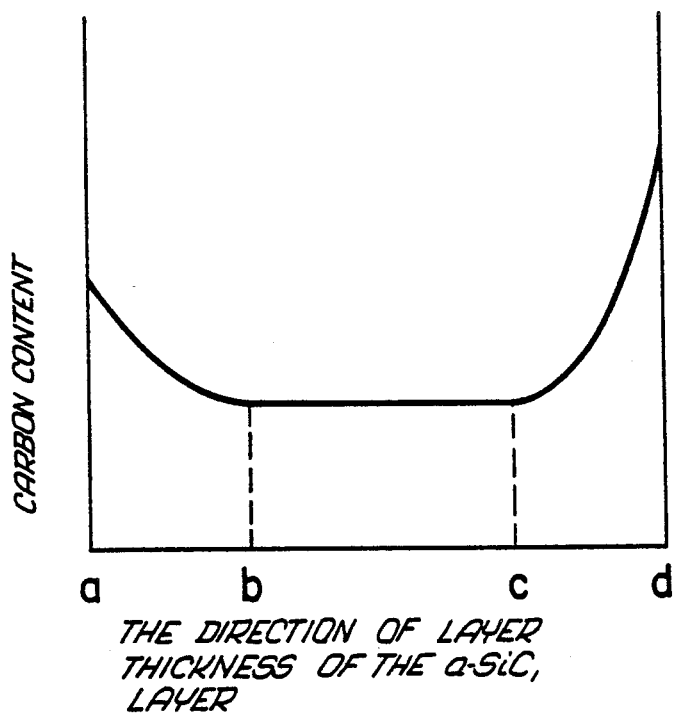
Figure 14:
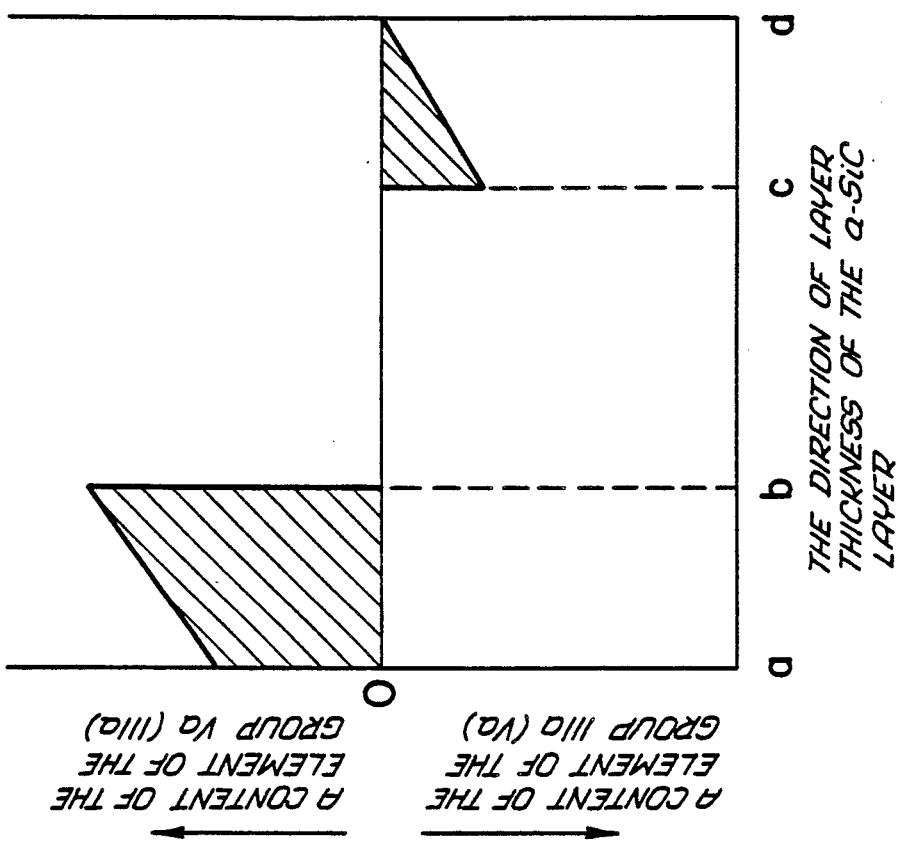
Figure 15:
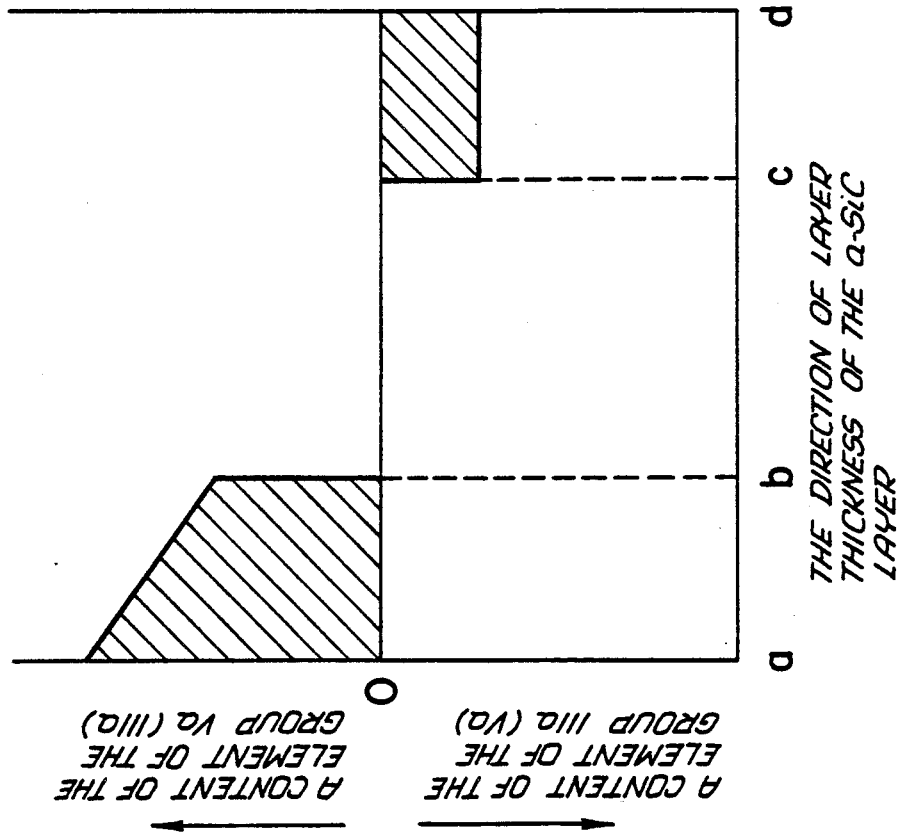
Figure 17:
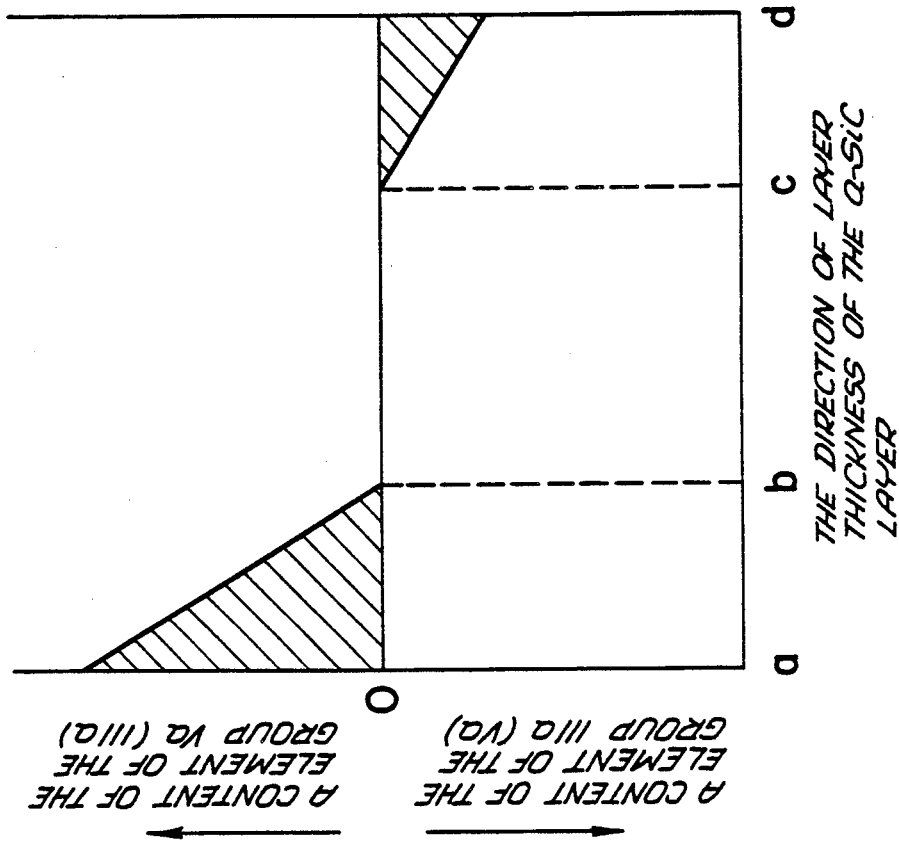
Figure 16:
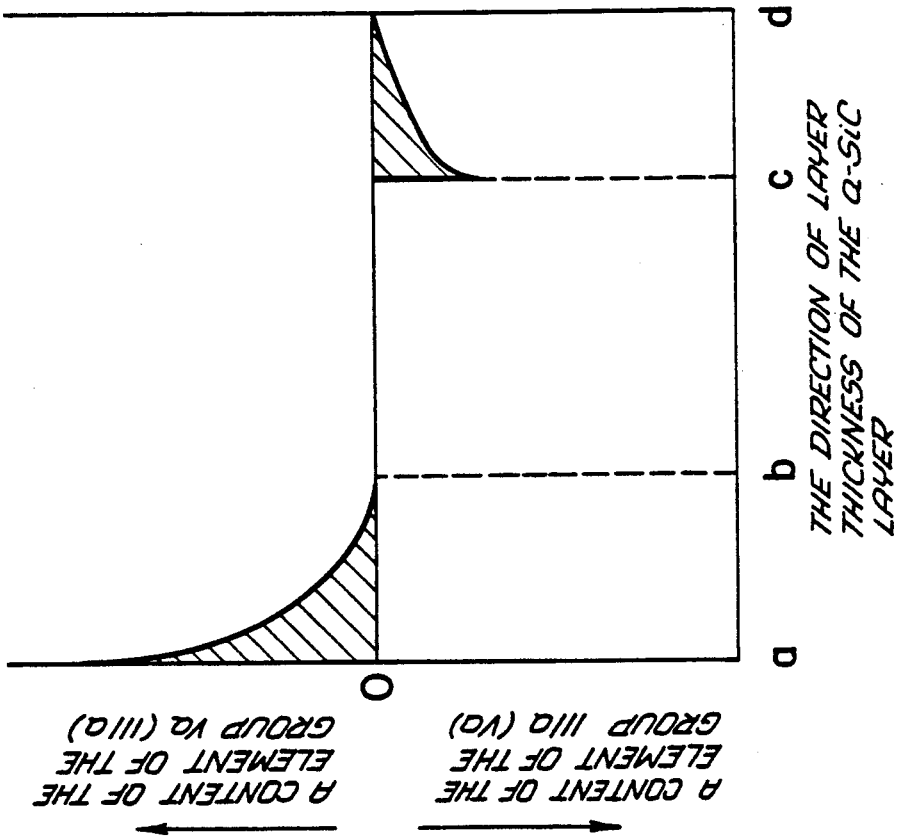

Various kinds of resulting a-SiC film, of which C-content x was set at 0.3 and H-content y was varied, were measured on the photoconductivity and dark conductivity with the results as shown in FIG. 5.

In FIG. 5, an axis of abscissa designates the H-content, that is, the value of y in [Si$_{1-x}$C$_x$]$_{1-y}$H$_y$ an axis of ordinate designating the conductivity, marks o designating a plot of the photoconductivity for a light having a wavelength of 550 nm (a quantity of light: 50 μW/cm$^2$), marks ● designating a plot of the dark conductivity, and (e), (f) designating the characteristic curve for the respective a-SiC films.

As obvious from FIG. 5, if the value of y exceeds 0.2, the higher photoconductivity and the lower dark conductivity are obtained.

EXAMPLE 3

In this EXAMPLE, the a-SiC films containing a B element (having a film thickness of about 1 μm) were formed with setting a flow rate of the SiH$_4$ gas at 200 sccm, setting a flow rate of the C$_2$H$_2$ gas at 20 sccm, setting a flow rate of the B$_2$H$_6$ gas diluted with H$_2$ gas (having a concentration of 0.2% or 40 ppm) at 5 to 500 sccm, setting a low rate of the H₂ gas at 200 sccm, setting the high-frequency electric power at 150 W, and setting the gas pressure at 0.6 Torr by means of the glow discharge.

Figure 6:
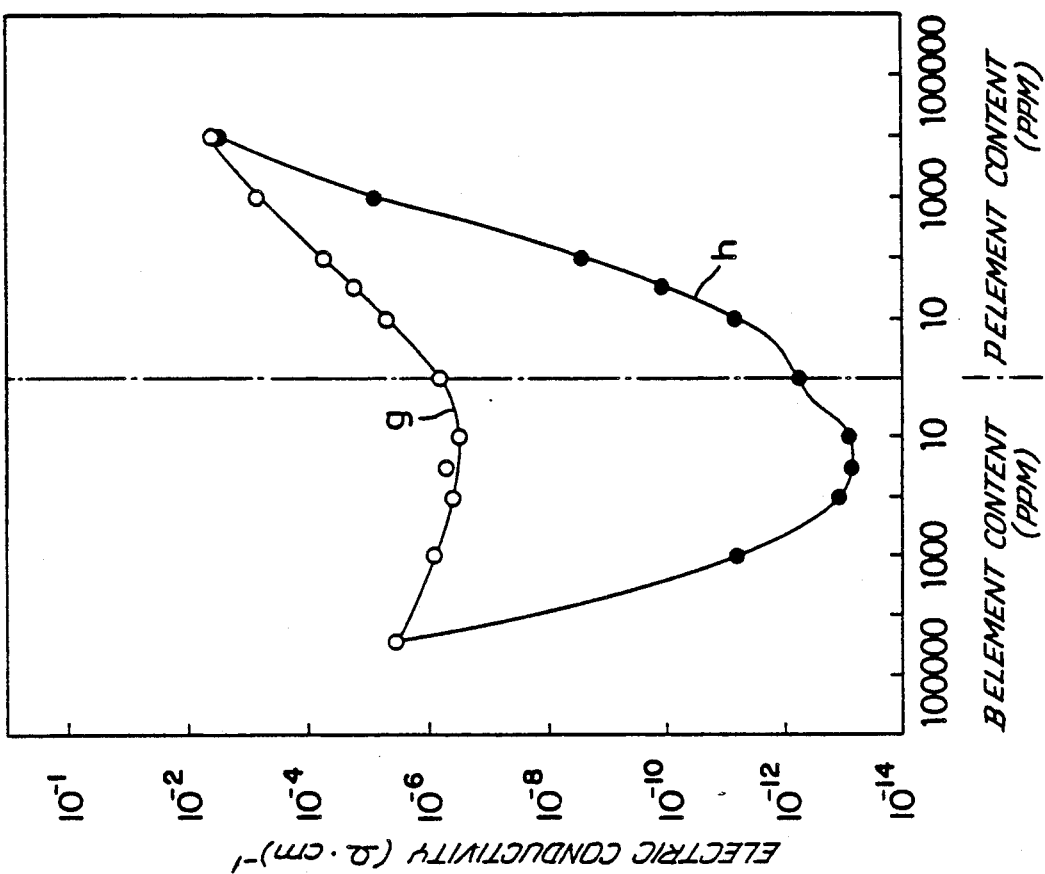
FIG. 6 is a graph showing a relation between a content of the IIIa- or Va group elements and a conductivity.

Various kinds of resulting a-SiC film, of which C-content was set at 0.2 and B element-content was changed, were measured on the photoconductivity and the dark conductivity with the results as shown in FIG. 6.

In this EXAMPLE, the PH₃ gas was used in place of the above described B₂H₆ gas to from also various kinds of a-SiC film, of which P element-content was varied, and they were measured on the photoconductivity and the dark conductivity.

In FIG. 6, an axis of abscissa designates the B element-content (or the P element-content), an axis of ordinate designating the conductivity, marks o designating a plot of the photoconductivity for a light having a wavelength of 550 nm (a quantity of light: 50 $\mu$W/cm²), marks ● designating a plot of the dark conductivity, and (g), (h) designating the characteristic curve for the respective a-SiC films.

As obvious from FIG. 6, if the B element is contained in a quantity of 1 to 1,000 ppm, the ratio of the photoconductivity to the dark conductivity is remarkably increased while if it exceeds 1,000 ppm, the dark conductivity is increased.

In addition, as to the P element, the photoconductivity and dark conductivity were still remarkably increased.

Furthermore, the C-content x and the H-content y of every a-SiC film according to this EXAMPLE is 0.20 and 0.35, respectively.

It could be confirmed that valence electrons of the above described a-SiC films were controlled by the B element and P element thereby exhibiting the superior film quality as semiconductor.

EXAMPLE 4

In this EXAMPLE, various kinds of a-SiC photoconductive layer (Sample No. A-1 to A-8) were formed under the relatively low-speed film-forming conditions shown in Table 1. And, the resulting respective a-SiC photoconductive layers were measured on the C-content, that is, the value of x, with the results as shown in Table 1.

In addition, in Table 1, Sample Nos. marked with * relate to ones beyond the scope of the present invention.

TABLE 1

| Sample No | Raw material gas SiH₄ sccm | Raw material gas C₂H₂ sccm | Diluent gas H₂ sccm | Pressure Torr | Electric power W | Time minute | Temperature °C. | Film-thickness $\mu$m | Carbon-content x |
|---|---|---|---|---|---|---|---|---|---|
| A-1 | 20 | 1 | 700 | 1.2 | 100 | 30 | 250 | 1.0 | 0.1 |
| A-2 | 20 | 2 | 700 | 1.2 | 100 | 30 | 250 | 1.0 | 0.2 |
| A-3 | 20 | 4 | 700 | 1.2 | 100 | 30 | 250 | 1.0 | 0.3 |
| A-4 | 20 | 8 | 700 | 1.2 | 100 | 30 | 250 | 1.0 | 0.4 |
| A-5* | 20 | 12 | 700 | 1.2 | 100 | 30 | 250 | 1.0 | 0.55 |
| A-6* | 20 | 16 | 700 | 1.2 | 100 | 30 | 250 | 1.0 | 0.6 |
| A-7* | 20 | 20 | 700 | 1.2 | 100 | 30 | 250 | 1.0 | 0.65 |
| A-8* | 20 | 25 | 700 | 1.2 | 100 | 30 | 250 | 1.0 | 0.7 |

Figure 18:
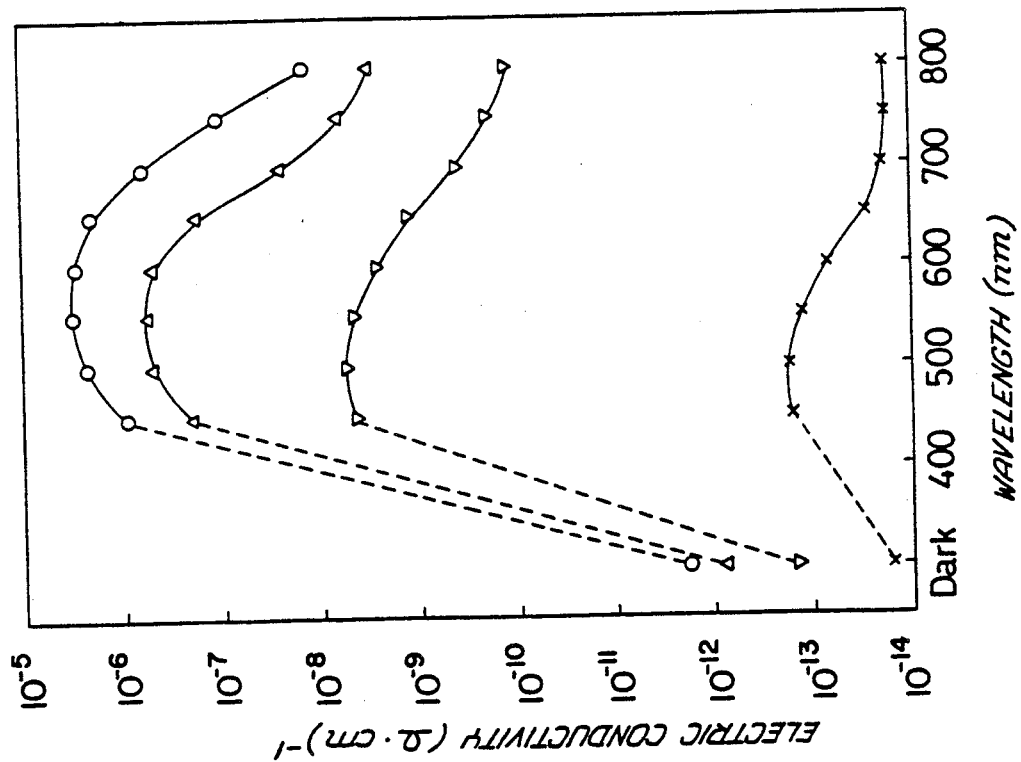

Sample Nos. A-1, A-2, A-3 and A-7 in Table 1 were measured on the spectrosensitive characteristics with the results as shown in FIG. 18. These measurements were carried out for the respective wavelengths under the condition that the quantity of light was 50 $\mu$W/cm². In addition, the respective samples were measured on the H-content (value of y) with the results that the Sample Nos. A-1, A-2, A-3 and A-7 had the value of y within a range of 0.2<y<0.4.

In FIG. 18, an axis of abscissa designates a wavelength, an axis of ordinate designating the conductivity, and marks o, △, ▽ and x being a plot for the Sample No. A-1, A-2, A-3 and A-7, respectively.

As obvious from FIG. 18, the Sample Nos. A-1, A-2 and A-3 according to the present invention showed the higher photoconductivity and of them, the Sample No. A-1 showed the highest photoconductivity.

EXAMPLE 5

In this EXAMPLE, various kinds of a-SiC photoconductive layer (Sample Nos. B-1 to B-5) were formed under the relatively high-speed film-forming conditions shown in Table 2. And, the resulting respective a-SiC photoconductive layers were measured on the c-content, that is the value of x, with the results as shown in Table 2.

In addition, the Sample Nos. marked with * in Table 2 relate to ones beyond the scope of the present invention.

TABLE 2

| Sample No | Raw material gas SiH₄ sccm | Raw material gas C₂H₂ sccm | Diluent gas H₂ sccm | Pressure Torr | Electric power W | Time minute | Temperature °C. | Film-thickness $\mu$m | Carbon-content x |
|---|---|---|---|---|---|---|---|---|---|
| B-1 | 200 | 10 | 300 | 1.2 | 100 | 6 | 250 | 1.0 | 0.15 |
| B-2 | 200 | 20 | 300 | 1.2 | 100 | 6 | 250 | 1.0 | 0.25 |
| B-3 | 200 | 40 | 300 | 1.2 | 100 | 6 | 250 | 1.0 | 0.35 |
| B-4* | 200 | 80 | 300 | 1.2 | 100 | 6 | 250 | 1.0 | 0.55 |
| B-5* | 200 | 120 | 300 | 1.2 | 100 | 6 | 250 | 1.0 | 0.65 |

Figure 19:
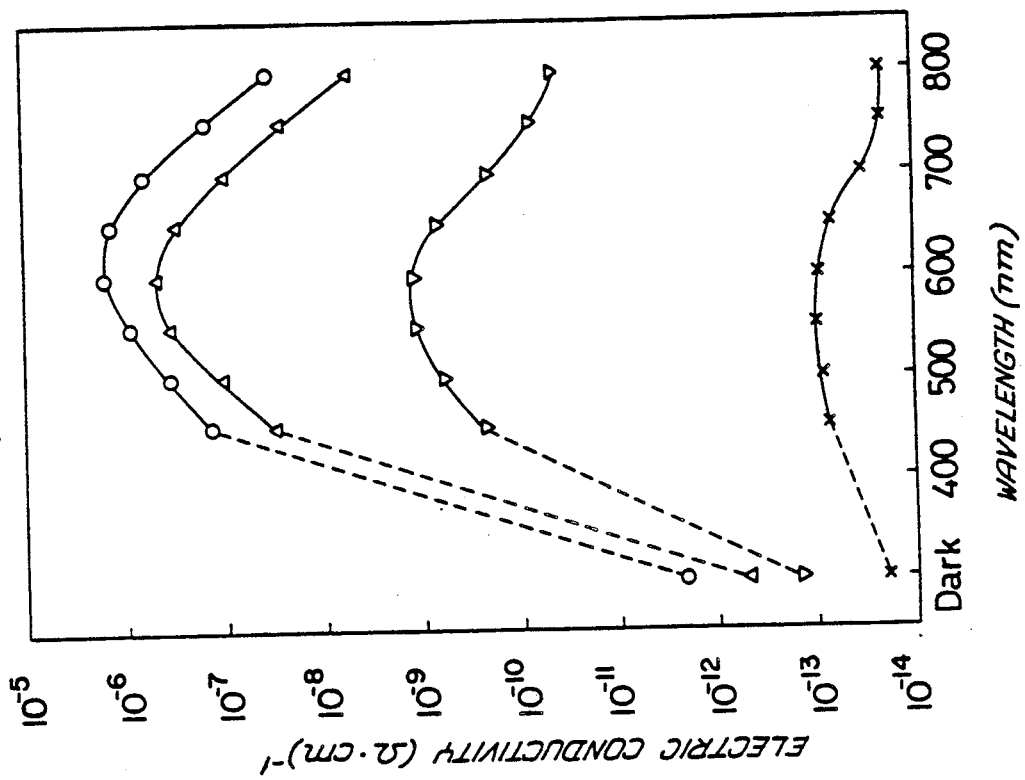

The Sample Nos. B-1, B-2, B-3 and B-5 in Table 2 were measured on the spectrosensitive characteristics with the results as shown in FIG. 19. In addition, the respective Samples were measured on the H content (value of y) with the results that the Sample Nos. B-1, B-2, B-3 and B-5 had the value of y within a range of 0.2<y<0.4, respectively.

In FIG. 19, an axis of abscissa designates the wavelength, an axis of ordinate designating the conductivity, and marks o, Δ, ∇ and x being a plot for the Sample No. B-1, B-2, B-3 and B-5, respectively.

As obvious from FIG. 19, the Sample Nos. B-1, B-2 and B-3 showed the higher photoconductivity and of them, the Sample No. B-1 showed the highest photoconductivity.

EXAMPLE 6

Next, the present inventors produced various kinds of a-SiC photoconductive layer (Sample Nos. C-1 to C-5) using the $CH_4$ gas in place of the $C_2H_2$ gas under the film-forming conditions shown in Table 3. And, the respective Samples were measured on the C-content (value of x) and the H-content (value of y) with the results as shown in Table 3.

TABLE 3

| Sample No | Raw material gas SiH$_4$ sccm | Raw material gas CH$_4$ sccm | Diluent gas H$_2$ sccm | Pressure Torr | Electric power W | Time minute | Temperature °C. | Film-thickness μm | Carbon-content x | Hydrogen-content y |
|---|---|---|---|---|---|---|---|---|---|---|
| C-1 | 10 | 10 | 300 | 1.2 | 100 | 60 | 250 | 1.0 | 0.05 | 0.15 |
| C-2 | 10 | 20 | 300 | 1.2 | 100 | 60 | 250 | 1.0 | 0.1 | 0.13 |
| C-3 | 10 | 40 | 300 | 1.2 | 100 | 60 | 250 | 1.0 | 0.15 | 0.12 |
| C-4 | 10 | 80 | 300 | 1.2 | 100 | 60 | 250 | 1.0 | 0.3 | 0.10 |
| C-5 | 10 | 120 | 300 | 1.2 | 100 | 60 | 250 | 1.0 | 0.5 | 0.10 |

The Sample Nos. C-1, C-2 and C-3 in Table 3 were measured on the spectrosensitive characteristics with the results as shown in FIG. 20.

Figure 20:
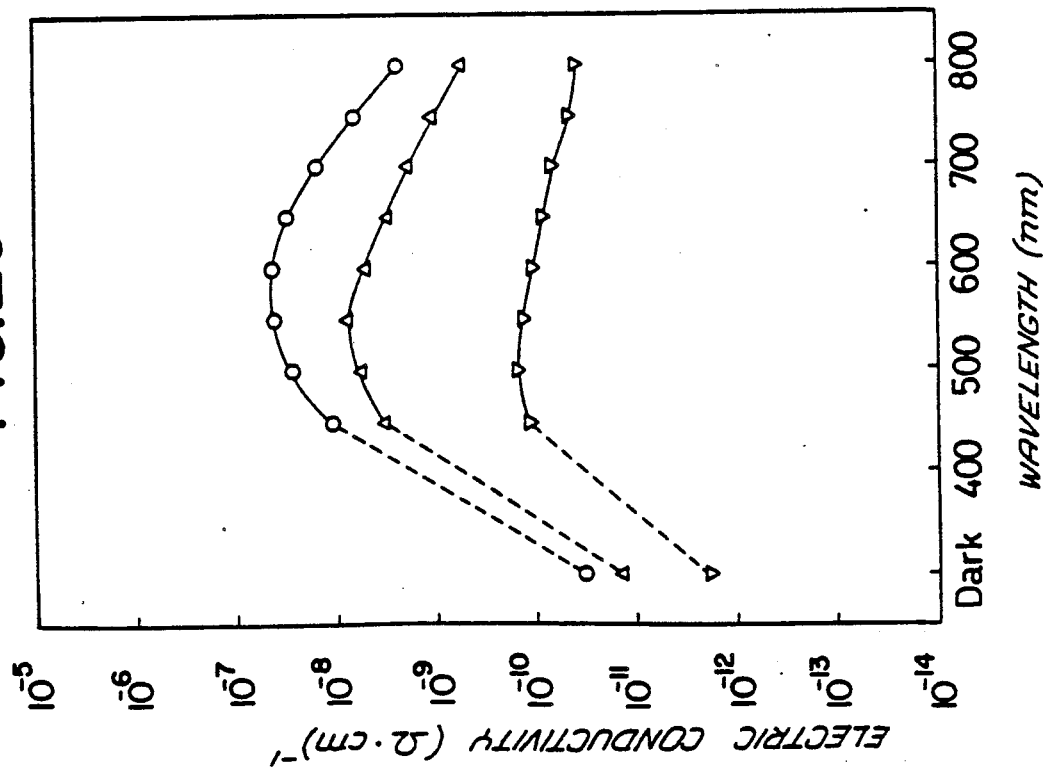

In FIG. 20, an axis of abscissa designates the wavelength, an axis of ordinate designating the photoconductivity, and marks o, Δ, ∇ and x being a plot for the Sample Nos. C-1, C-2 and C-3, respectively.

As obvious from FIG. 20, with the a-SiC film having the value of y less than 0.2, even though the value of x is within the preferable range, the sufficient photoconductive characteristics can not be obtained

EXAMPLE 7

In this EXAMPLE, various kinds of a-SiC photoconductive layer (Sample Nos. D-1 to D-5) were formed under the low-speed film-forming conditions shown in Table 4. And, the resulting respective a-SiC photoconductive layers were measured on the C-content, that is the value of x, and the B element-content with the results as shown in Table 4.

In addition, the Sample Nos. marked with * in Table 4 relate to ones beyond the scope of the present invention and marks ** show the flow rate of the $B_2H_6$ gas diluted with the $H_2$ gas at the concentration of 400 ppm.

TABLE 4

| Sample No | Raw material gas SiH$_4$ sccm | Raw material gas C$_2$H$_2$ sccm | Diluent gas H$_2$ sccm | Impurity gas B$_2$H$_6$ ** sccm | Pressure Torr | Electric power W | Time minute | Temperature °C. | Film thickness μm | Carbon content x | B-element content ppm |
|---|---|---|---|---|---|---|---|---|---|---|---|
| D-1 | 20 | 1 | 700 | 0.2 | 1.2 | 100 | 30 | 250 | 1.0 | 0.1 | 2 |
| D-2 | 20 | 1 | 700 | 2 | 1.2 | 100 | 30 | 250 | 1.0 | 0.1 | 20 |
| D-3 | 20 | 1 | 700 | 20 | 1.2 | 100 | 30 | 250 | 1.0 | 0.1 | 200 |
| D-4 | 20 | 1 | 700 | 40 | 1.2 | 100 | 30 | 250 | 1.0 | 0.1 | 500 |
| D-5* | 20 | 1 | 700 | 100 | 1.2 | 100 | 30 | 250 | 1.0 | 0.1 | 1500 |

Figure 21:
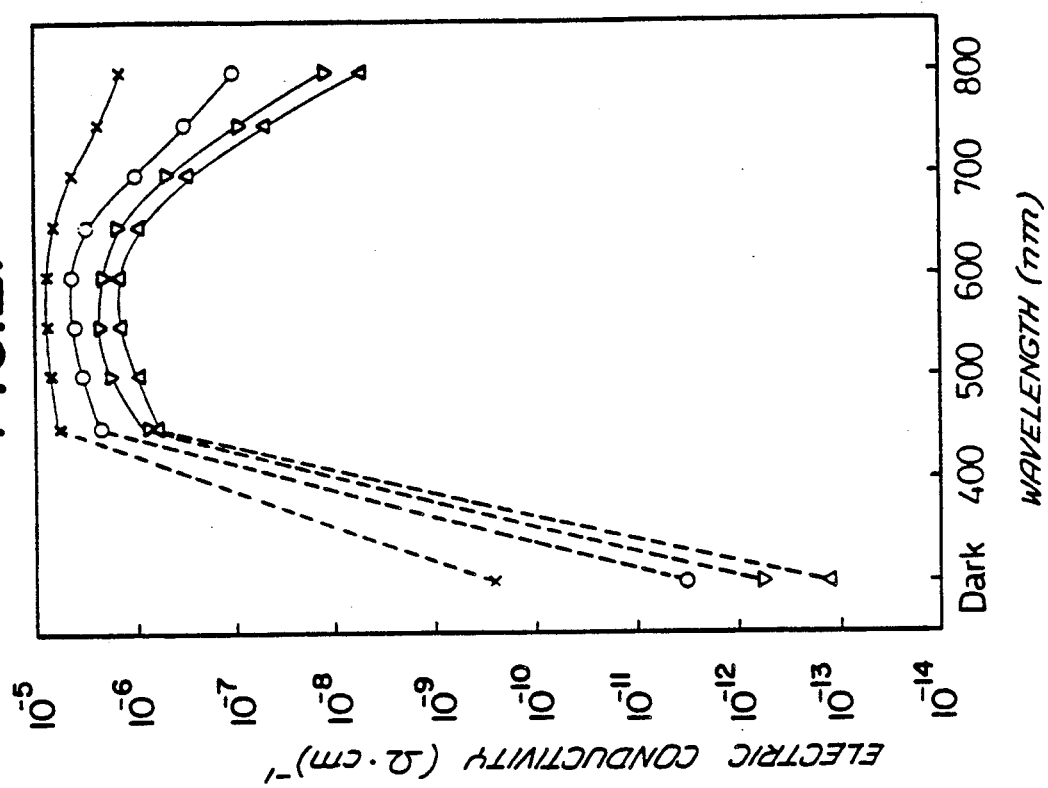

The Sample Nos. D-1, D-2, D-4 and D-5 in Table 4 were measured on the spectrosensitive characteristics with the results as shown in FIG. 21. In addition, the respective Samples were measured on the H-content (value of y) with the results that they all had the value of y within a range of 0.2<y<0.4.

In FIG. 21, an axis of abscissa designates the wavelength, an axis of ordinate designating the conductivity, and marks o, Δ, ∇ and x being a plot for the Sample Nos. D-1, D-2, D-4 and D-5, respectively.

As obvious from FIG. 21, the Sample Nos. D-1, D-2 and D-4 attained the higher photoconductivity.

EXAMPLE 8

In this EXAMPLE, various kinds of a-SiC photoconductive layer (Sample Nos. E-1 to E-5) were formed under the high-speed film-forming conditions shown in Table 5. And, the resulting respective a-SiC photoconductive layers were measured on the C-content (value of x) and the B element-content with the results as shown in Table 5.

In addition, the Sample Nos. marked with * show ones beyond the scope of the present invention and marks ** show the flow rate of the $B_2H_6$ gas diluted with the $H_2$ gas at the concentration of 0.4%.

TABLE 5

| Sample No | Raw material gas SiH$_4$ sccm | Raw material gas C$_2$H$_2$ sccm | Diluent gas H$_2$ sccm | Impurity gas B$_2$H$_6$ ** sccm | Pressure Torr | Electric power W | Time minute | Temperature °C. | Film thickness μm | Carbon content x | B-element content ppm |
|---|---|---|---|---|---|---|---|---|---|---|---|
| E-1 | 200 | 20 | 300 | 0.2 | 1.2 | 100 | 6 | 250 | 1.0 | 0.25 | 2 |
| E-2 | 200 | 20 | 300 | 2 | 1.2 | 100 | 6 | 250 | 1.0 | 0.25 | 20 |
| E-3 | 200 | 20 | 300 | 20 | 1.2 | 100 | 6 | 250 | 1.0 | 0.25 | 200 |
| E-4 | 200 | 20 | 300 | 40 | 1.2 | 100 | 6 | 250 | 1.0 | 0.25 | 500 |
| E-5* | 200 | 20 | 300 | 100 | 1.2 | 100 | 6 | 250 | 1.0 | 0.25 | 1500 |

The Sample Nos. E-1, E-2, E-4 and E-5 in Table 5 were measured on the spectrosensitive characteristics with the results as shown in FIG. 22. In addition, the respective Samples were measured on the H-content (value of y) with the results that 0.2<y<0.4 was held good.

In FIG. 22, an axis of abscissa designates the wavelength, an axis of ordinate designating the conductivity, and marks o, Δ, ▽ and x being a plot for the Sample Nos. E-1, E-2, E-4 and E-5, respectively.

As obvious from FIG. 22, the Samples according to the present invention attained the higher photoconductivity.

EXAMPLE 9

Next, the present inventors produced various kinds of a-SiC photoconductive layer (Sample Nos. F-1 to F-5) using the $CH_4$ gas in place of the $C_2H_2$ gas under the film-forming conditions shown in Table 6. And, the respective Samples were measured on the C-content (value of x), the H-content (value of y) and the B element-content with the results as shown in Table 6.

In addition, marks * in Table 6 show the flow rate of the $B_2H_6$ gas diluted with the $H_2$ gas at the concentration of 100 ppm.

was formed to obtain negative charge type electrophotographic sensitive members.

And, the second layer zone and third layer zone were measured on the B element-content and the first layer zone was measured on the P element-content content by means of the secondary ion mass analyzer with the results that they were 40 ppm, 100 ppm and 2,000 ppm in this order.

In addition, the first layer zone was measured on the C-content (value of x) by the XMA method with the result that x=0.23 and on the H-content (value of y) by the infrared ray absorption method with the result that y=0.35. Similarly, the second layer zone was measured on the values of x and y with the results that x=0.3 and y=0.17 and the third layer zone was measured on the values of x and y with the results that x=0.3 and y=0.40.

The resulting electrophotographic sensitive members were measured on the characteristics by means of the electrophotographic characteristic measuring apparatus with the results that the photosensitivity and surface electric potential were superior and the residual electric

TABLE 6

| Sample No | Raw material gas SiH$_4$ sccm | Raw material gas CH$_4$ sccm | Diluent gas H$_2$ sccm | Impurity gas B$_2$H$_6$ * sccm | Pressure Torr | Electric power W | Time minute | Temperature °C. | Film-thickness μm | Carbon content x | Hydrogen content y | B-element-content ppm |
|---|---|---|---|---|---|---|---|---|---|---|---|---|
| F-1 | 10 | 10 | 300 | 5 | 1.2 | 100 | 60 | 250 | 1.0 | 0.05 | 0.15 | 20 |
| F-2 | 10 | 20 | 300 | 10 | 1.2 | 100 | 60 | 250 | 1.0 | 0.1 | 0.13 | 20 |
| F-3 | 10 | 40 | 300 | 20 | 1.2 | 100 | 60 | 250 | 1.0 | 0.15 | 0.12 | 20 |
| F-4 | 10 | 80 | 300 | 40 | 1.2 | 100 | 60 | 250 | 1.0 | 0.3 | 0.10 | 20 |
| F-5 | 10 | 120 | 300 | 60 | 1.2 | 100 | 60 | 250 | 1.0 | 0.5 | 0.10 | 20 |

The Sample Nos. F-1, F-2 and F-3 in Table 6 were measured on the spectrosensitive characteristics with the results as shown in FIG. 23.

In FIG. 23, an axis of abscissa designates the wavelength, an axis of ordinate designating the conductivity, and marks o, Δ and ▽ being a plot for the Sample No. F-1, F-2 and F-3, respectively.

As obvious from FIG. 23, the high conductivity can not be obtained for all the Sample Nos. F-1, F-2 and F-3.

EXAMPLE 10

The first layer zone (2a), the second layer zone (2b) and the third layer zone (2c) were formed on the substrate (25 mm×50 mm) formed of aluminum placed within the reaction pipe of the glow discharge decomposition apparatus under the film-forming conditions shown in Table 7.

Subsequently, the organic photoconductive layer (having a film thickness of about 15 μm) formed of a dispersion of hydrazone compounds in polycarbonates potential was low.

In addition, the $PH_3$ gas marked with * was diluted with the $H_2$ gas at the concentration of 0.2% and the $B_2H_6$ gas marked with ** was diluted with the $H_2$ gas at the concentration of 40 ppm.

TABLE 7

| Kind of layer | Flow rate of gas introduced (sccm) SiH$_4$ | C$_2$H$_2$ | H$_2$ | PH$_3$ * | B$_2$H$_6$** | Gas pressure (Torr) | High-frequency electric power (W) | Substrate temperature (°C.) | Thickness (μm) |
|---|---|---|---|---|---|---|---|---|---|
| Third layer zone | 200 | 20 | — | — | 600 | 0.60 | 150 | 250 | 0.3 |
| Second layer zone | 200 | 20 | — | — | 250 | 0.60 | 150 | 250 | 1.0 |
| First layer zone | 80 | 10 | 350 | 120 | — | 0.45 | 100 | 250 | 0.5 |

Figure 24:
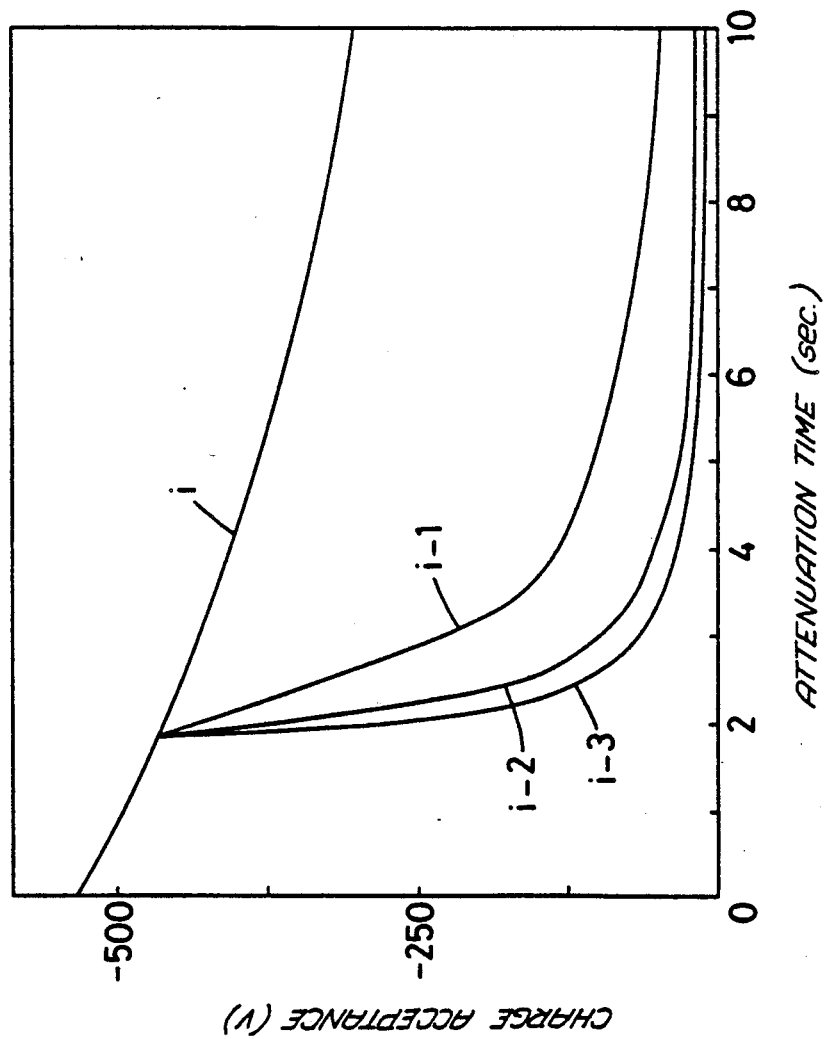

Next, the negative charge type electrophotographic sensitive members having an a-SiC three-layer structure obtained in the present EXAMPLE 10 were measured on the dark- and light attenuation characteristics with the results as shown in FIG. 24. In addition, they were measured on the spectrosensitive characteristics with the results as shown in FIG. 25.

In FIG. 24, an axis of abscissa designates the attenuation time (sec), an axis of ordinate designating the surface electric potential (volt), i showing the dark attenuation curve, and i-1, i-2 and i-3 showing the light attenuation curve at the exposure wavelength of 400 nm, 450 nm and 550 nm, respectively.

The following measuring conditions were selected. That is to say, the negative charge type electrophotographic sensitive members were charged by means of the corona charger to which the voltage of −36 kV was applied. The quantity of light exposed at the respective wavelengths was selected at 0.15 μW/cm². And, the change of the surface electric potential was measured by the use of the surface potentiometer having the light transmission type measuring probe.

Figure 25:
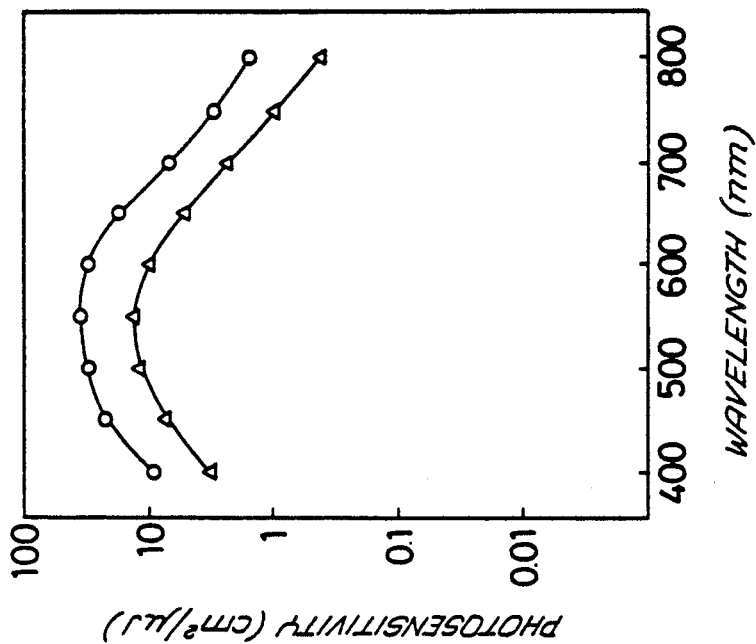

As obvious from FIGS. 24, 25, the electrophotographic sensitive members showed the sufficient charging characteristics and dark attenuation characteristics and the superior light attenuation characteristics.

In addition, in FIG. 25, an axis of abscissa designates the wavelength, an axis of ordinate designating the photosensitivity, and marks o being a plot according to the present EXAMPLE. In addition, for comparison, the a-SiC photoconductive layer having a single-layer structure was formed on the substrate formed of aluminum with setting the flow rate of the SiH$_4$ gas at 200 sccm, the C$_2$H$_2$ gas at 20 sccm and the B$_2$H$_6$ gas (diluted with the H$_2$ gas at the concentration of 40 ppm) at 500 sccm under the film-forming conditions that the gas pressure was 0.60 Torr, the high-frequency electric power being 150 W, the substrate temperature being 250° C., and the thickness being 1.5 μm and the organic photoconductive layer was formed on said a-SiC photoconductive layer by the same method as in the present EXAMPLE to produce the negative charge type electrophotographic sensitive member. A plot for this sensitive member was shown by marks Δ.

As obvious from FIG. 25, the sensitive members according to the present EXAMPLE are remarkably superior in photosensitivity.

EXAMPLE 11

In addition, the present inventors produced 14 kinds of electrophotographic sensitive member (Sample Nos. G-1 to G-14), of which P element-content in the first layer zone and the B element-content in the third layer zone were varied, as shown in Table 8, and B element-content in the second layer zone was set at 1 ppm, by changing the flow rates of the PH$_3$ gas and the B$_2$H$_6$ as in the production of the electrophotographic sensitive members according to the EXAMPLE 10.

These electrophotographic sensitive members were measured on the photosensitivity, surface electric potential and residual electric potential with the results as shown in Table 8.

In addition, the sensitive members marked with * in Table 8 are beyond the scope of the present invention.

In Table 8, the photosensitivity is classified into three grades, that is the grade marked with ⊙, the grade marked with o and the grade marked with Δ, by the relative evaluation. Marks ⊙ show the case where the most superior photosensitivity was attained, marks o showing the case where the somewhat superior photosensitivity was attained, and marks Δ showing the case where the photosensitivity was slightly inferior to that in other cases.

Also the characteristics of surface electric potential are classified into three grades, that is the grade marked with ⊙, the grade marked with o and the grade marked with Δ in evaluation. Marks ⊙ show the case where the highest surface electric potential was attained, marks o showing the case where the somewhat high surface electric potential was attained, and marks Δ showing the case where the higher surface electric potential in comparison with that in other cases was not observed.

In addition, also the residual electric potential is classified into three grades by the relative evaluation. Marks show the case where the residual electric potential is least, marks o showing the case where the reduction of the residual electric potential is observed to some extent, and marks Δ showing the case where the reduction of the residual electric potential in comparison with that in other cases is not observed.

TABLE 8

| Sensitive member | P element-content of the first layer zone (ppm) | B element-content of the third layer zone (ppm) | Photo-sensitivity | Charge acceptance | Residual potential |
| --- | --- | --- | --- | --- | --- |
| G-1* | 1500 | 0.5 | Δ | ○ | Δ |
| G-2 | 70 | 15 | ○ | ○ | ○ |
| G-3 | 0 | 100 | ○ | ○ | ○ |
| G-4 | 200 | 2 | ○ | ○ | ○ |
| G-5 | 1500 | 2 | ○ | ○ | ○ |
| G-6 | 200 | 15 | ⊙ | ⊙ | ⊙ |
| G-7 | 500 | 6 | ⊙ | ⊙ | ⊙ |
| G-8 | 1500 | 40 | ⊙ | ⊙ | ⊙ |
| G-9 | 2500 | 70 | ⊙ | ⊙ | ⊙ |
| G-10 | 4000 | 70 | ○ | ⊙ | ⊙ |
| G-11 | 2500 | 150 | ○ | ○ | ⊙ |
| G-12 | 4000 | 600 | ○ | ○ | ○ |
| G-13* | 2500 | 1300 | Δ | Δ | Δ |
| G-14* | 6000 | 70 | Δ | Δ | Δ |

As obvious from Table 8, the sensitive members G-2 to G-12 had the superior photosensitivity, the increased surface electric potential and the reduced residual electric potential.

However, the sensitive member G-1 was inferior in photosensitivity and residual electric potential. In addition, the sensitive member G-13 and the sensitive member G-14 were not improved in all characteristics of the photosensitivity, surface electric potential and residual potential.

EXAMPLE 12

In this EXAMPLE, 6 kinds of electrophotographic sensitive member (Sample Nos. H-1 to H-6) were produced by changing the IIIa group element-content in the second layer zone (2b), as shown in Table 9, in the production of the electrophotographic sensitive members according to the EXAMPLE 10.

In addition, the sensitive members marked with * in Table 9 are beyond the scope of the present invention.

TABLE 9

| Sensitive member | B-element-content of the second layer zone (ppm) | Photo-sensitivity | Charge acceptance | Residual potential |
| --- | --- | --- | --- | --- |
| H-1 | 0 | ○ | ⊙ | ○ |
| H-2 | 1 | ⊙ | ⊙ | ⊙ |
| H-3 | 15 | ⊙ | ⊙ | ⊙ |
| H-4 | 80 | ⊙ | ⊙ | ⊙ |
| H-5 | 160 | ○ | ○ | ⊙ |
| H-6 * | 300 | ○ | Δ | ⊙ |

As obvious from Table 9, the sensitive members H-1 to H-5 showed the superior photosensitivity, increased surface electric potential and reduced residual electric potential.

EXAMPLE 13

The present inventors continuously and gradually increased the quantity of the IIIa group elements in the third layer zone (2c) from 600 sccm to 1,200 sccm with the formation of the film in the production of the electrophotographic sensitive members according to the EXAMPLE 10.

The resulting electrophotographic sensitive members were measured on the residual electric potential with the result that the residual electric potential was reduced by about 20%.

EXAMPLE 14

The first layer zone (2a), the second layer zone (2b) and the third layer zone (2c) were formed on the substrate (25 mm×50 mm) formed of aluminum placed within the reaction pipe of the glow discharge decomposition apparatus in this order under the film-forming conditions shown in Table 10.

Subsequently, the organic photoconductive layer (having a film-thickness of about 15 μm) mainly comprising 2,4,7-trinitrofluorenon was formed on the third layer zone (2c) to obtain the positive charge type electrophotographic sensitive members.

And, the resulting positive charge type electrophotographic sensitive members were measured on the B element-content of the first layer zone and the second layer zone and the P element-content of the third layer zone by means of the secondary ion mass analyzer with the results that they were 1,000 ppm, 40 ppm and 40 ppm in this order.

In addition, the C-content (value of x) of the first layer zone was measured by the XMA method with the result that x=0.23 and the H-content (value of y) of the first layer zone was measured by the infrared ray absorption method with the result that y=0.35. Similarly, the value of x and the value of y of the second layer zone were measured with the results that x=0.3 and y=0.17. Furthermore, the value of x and the value of y of the third layer zone were measured with the results that x=0.3 and y=0.40.

The resulting electrophotographic sensitive members were measured on the characteristics by means of the electrophotographic characteristic measuring apparatus with the results that the superior photoconductivity and surface electric potential were attained and the reduced residual electric potential was attained.

In addition, the $PH_3$ gas marked with * in Table 10 was diluted with the $H_2$ gas at the concentration of 33 ppm. The $B_2H_6$ gas marked with  in Table 10 was diluted with the $H_2$ gas at the concentration of 0.2%. Besides, the $B_2H_6$ gas marked with * in Table 10 was diluted with the $H_2$ gas at the concentration of 40 ppm.

face electric potential (volt), j designating the dark attenuation curve, and j-1, j-2 and j-3 designating the light attenuation curve in the case of the exposure wavelength of 400 nm, 450 nm and 550 nm, respectively.

The positive charge type electrophotographic sensitive members were charged by means of the corona charger, to which the voltage of +6 kV was applied, and the exposure was executed at the quantity of light at the respective wavelengths of 0.15 μW/cm². And, the change of the surface electric potential was measured by means of the surface potentiometer having the light transmission type measuring probe.

As obvious from FIG. 26, the electrophotographic sensitive members having the sufficient charging characteristics and dark attenuation characteristics and the superior light attenuation characteristics can be obtained.

In addition, in FIG. 27, an axis of abscissa designates the wavelength, an axis of ordinate designating the photosensitivity, and marks o designating a plot for the present EXAMPLE. Besides, for comparison, the photoconductive layer having an a-SiC single-layer structure was formed on the substrate formed of aluminum with setting a flow rate of the $SiH_4$ gas, the $C_2H_2$ gas and the $PH_3$ gas (diluted with the $H_2$ gas at the concentration of 33 ppm) at 200 sccm, 20 sccm and 500 sccm, respectively, under the film-forming conditions that the gas pressure was 0.60 Torr, the high-frequency electric power being 150 W, the substrate temperature being 250° C., and the thickness being 1.5 μm, and the organic photoconductive layer was formed on said photoconductive layer by the same method as in the present EXAMPLE to produce a positive charge type electrophotographic sensitive member. A plot for this sensitive member was shown by marks Δ.

As obvious from FIG. 27, the sensitive member according to the present EXAMPLE is remarkably superior in photosensitivity.

EXAMPLE 15

In addition, the present inventors produced 14 kinds of electrophotographic sensitive member (Sample Nos. I-1 to I-14), of which B element-content of the first layer zone and the P element-content of the third layer zone were varied, as shown in Table 11, by changing the flow rates of the $PH_3$ gas and the $B_2H_6$ gas in the

TABLE 10

| Kind of layer | Flow rate of gas introduced (sccm) | | | | | Gas pressure (Torr) | High-frequency electric power (W) | Substrate temperature (°C.) | Thickness (μm) |
| --- | --- | --- | --- | --- | --- | --- | --- | --- | --- |
| | $SiH_4$ | $C_2H_2$ | $H_2$ | $PH_3$ * | $B_2H_6$** | | | | |
| Third layer zone | 200 | 20 | 0 | 600 | — | 0.60 | 150 | 250 | 0.3 |
| Second layer zone | 200 | 20 | 0 | — | ***250 | 0.60 | 150 | 250 | 1.0 |
| First layer zone | 80 | 10 | 350 | — | 80** | 0.45 | 80 | 250 | 0.5 |

Subsequently, the positive charge type electrophotographic sensitive members having an a-SiC three-layer structure obtained in the present EXAMPLE 14 were measured on the dark- and light attenuation characteristics with the results as shown in FIG. 26. In addition, the spectrosensitive characteristics were measured with the results as shown in FIG. 27.

In FIG. 26, an axis of abscissa designates the attenuation time (sec), an axis of ordinate designating the surproduction of the electrophotographic sensitive members according to the EXAMPLE 14.

These electrophotographic sensitive members were measured on the photosensitivity, surface electric potential and residual electric potential with the results as shown in Table 11.

In addition, the sensitive members marked with * in Table 11 are beyond the scope of the present invention.

The photosensitivity, surface electric potential and residual electric potential in Table 11 are evaluated in the same manner as in Table 8 relating to the EXAMPLE 11.

TABLE 11

| Sensitive member | B element-content of the first layer zone (ppm) | P element-content of the third layer zone (ppm) | Photo-sensitivity | Charge acceptance | Residual potential |
|---|---|---|---|---|---|
| I-1 | 70 | 13 | ○ | ○ | ○ |
| I-2 | 200 | 2 | ○ | ○ | ○ |
| I-3 | 1500 | 2 | ○ | ◉ | ◉ |
| I-4 | 200 | 13 | ◉ | ◉ | ◉ |
| I-5 | 800 | 5 | ◉ | ◉ | ◉ |
| I-6 | 1500 | 25 | ◉ | ◉ | ◉ |
| I-7 | 2500 | 50 | ◉ | ◉ | ◉ |
| I-8 | 4000 | 50 | ○ | ◉ | ◉ |
| I-9 | 2500 | 150 | ○ | ○ | ○ |
| I-10 | 6000 | 150 | ○ | ○ | ○ |
| I-11* | 2500 | 400 | △ | △ | △ |
| I-12* | 15000 | 50 | △ | △ | △ |
| I-13* | 2500 | 0.5 | △ | ○ | △ |
| I-14 | 5 | 100 | ○ | ○ | ○ |

As obvious from Table 11, the sensitive members I-1 to I-10 and I-14 showed the superior photosensitivity, the increased surface electric potential and the reduced residual electric potential.

However, the sensitive member I-13 was inferior in photosensitivity and residual electric potential and the sensitive member I-14 was not improved in all characteristics of the photosensitivity, surface electric potential and residual electric potential.

EXAMPLE 16

In this EXAMPLE, 6 kinds of electrophotographic sensitive member (Sample Nos. J-1 to J-6) were produced by changing the IIIa group element-content of the second layer zone (2b) in such the manner as shown in Table 12 in the production of the electrophotographic sensitive members according to the EXAMPLE 14.

In addition, the sensitive members marked with * in Table 12 are beyond the scope of the present invention.

TABLE 12

| Sensitive member | B-element-content of the second layer zone (ppm) | Photo-sensitivity | Charge acceptance | Residual potential |
|---|---|---|---|---|
| J-1 | 0 | ○ | ◉ | ○ |
| J-2 | 1 | ○ | ◉ | ○ |
| J-3 | 15 | ◉ | ◉ | ◉ |
| J-4 | 80 | ◉ | ◉ | ◉ |
| J-5 | 160 | ○ | ○ | ◉ |
| J-6 * | 300 | ○ | △ | ◉ |

As obvious from Table 12, the sensitive members J-1 to J-6 showed the superior photosensitivity, the increased surface electric potential and the reduced residual electric potential.

EXAMPLE 17

The present inventors continuously and gradually increased the quantity of the Va group elements in the third layer zone (2c) from 600 sccm to 1,200 sccm with the film formation in the production of the electrophotographic sensitive members according to the EXAMPLE 14.

The resulting electrophotographic sensitive members were measured on the residual electric potential with the result that it was reduced by about 20%.

EFFECTS OF THE INVENTION

As above described, with the electrophotographic sensitive member according to the present invention, since the respective layer zones containing the IIIa group elements and the Va group elements in the quantity within the appointed ranges were formed within the a-SiC photoconductive layer, the superior photoconductivity could be attained, the surface electric potential could be increased, and the residual electric potential could be reduced.

In addition, with this electrophotographic sensitive member, the a-SiC photoconductive layer was brought into non-ohmic contact with the substrate thereby the rectification capacity was enhanced and thus the electrophotographic sensitive member showing the high surface electric potential and the reduced residual electric potential for use in positive charge or negative charge could be provided.

What is claimed is:

1. An electrophotographic sensitive member comprising an amorphous silicon carbide photoconductive layer and an organic photoconductive layer piled on an electrically conductive substrate in this order, characterized in that said amorphous silicon carbide photoconductive layer has a layer construction comprising a first layer zone, a second layer zone and a third layer zone formed in this order, said first layer zone containing Va group elements in the Periodic Table in a quantity of 0 to 5,000 ppm, said second layer zone containing IIIa group elements in the Periodic Table in a quantity of 0 to 200 ppm, said third layer zone containing IIIa group elements in the Periodic Table in a quantity of 1 to 1,000 ppm, a thickness of the first layer zone being set within a range of 0.01 to 3 μm, a thickness of the second layer zone being set within a range of 0.01 to 3 μm, and a thickness of the third layer zone being set within a range of 0.01 to 3 μm.

2. An electrophotographic sensitive member as set forth in claim 1 wherein said content of the IIIa group element in the Periodic Table in the third layer zone is gradually increased toward said organic semiphotoconductive layer.

3. An electrophotographic sensitive member comprising an amorphous silicon carbide photoconductive layer and an organic photoconductive layer piled on an electrically conductive substrate in this order, characterized in that said amorphous silicon carbide photoconductive layer has a layer construction comprising a first layer zone, a second layer zone and a third layer zone formed in this order, said first layer zone containing IIIa group elements in the Periodic Table in a quantity of 1 to 10,000 ppm, said second layer zone containing IIIa group elements in the Periodic Table in a quantity of 0 to 200 ppm, said third layer zone containing Va group elements in the Periodic Table in a quantity of 1 to 300 ppm, a thickness of the first layer zone being set within a range of 0.01 to 3 μm, a thickness of the second layer zone being set within a range of 0.01 to 3 μm, and a thickness of the third layer zone being set within a range of 0.01 to 3 μm.

4. An electrophotographic sensitive member as set in claim (3) wherein said content of said Va group elements in the Periodic Table in the third layer zone is gradually increased toward the organic semiphotoconductive layer.

* * * * *